(12) United States Patent
Fosnight et al.

(10) Patent No.: US 12,084,281 B2
(45) Date of Patent: *Sep. 10, 2024

(54) SYSTEM HAVING ROBOTIC WORKSTATION

(71) Applicant: WALMART APOLLO, LLC, Bentonville, AR (US)

(72) Inventors: William J. Fosnight, Windham, NH (US); John G. Lert, Jr., Wakefield, MA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,080

(22) Filed: Apr. 7, 2023

(65) Prior Publication Data

US 2023/0249914 A1     Aug. 10, 2023

Related U.S. Application Data

(63) Continuation of application No. 16/676,732, filed on Nov. 7, 2019, now Pat. No. 11,623,826.

(Continued)

(51) Int. Cl.
  *B65G 1/137*   (2006.01)
  *B65G 1/04*   (2006.01)
  (Continued)

(52) U.S. Cl.
  CPC ......... *B65G 1/1378* (2013.01); *B65G 1/0492* (2013.01); *B65G 1/065* (2013.01); *B65G 47/681* (2013.01); *B65G 47/905* (2013.01)

(58) Field of Classification Search
  CPC .... B65G 1/1378; B65G 1/0492; B65G 1/065; B65G 47/681; B65G 47/905
  See application file for complete search history.

(56) References Cited

U.S. PATENT DOCUMENTS

| | | | |
|---|---|---|---|
| 9,558,472 | B1 | 1/2017 | Tubilla Kuri |
| 9,908,696 | B1 | 3/2018 | Zevenbergen |

(Continued)

FOREIGN PATENT DOCUMENTS

| | | |
|---|---|---|
| CN | 202625405 | 12/2012 |
| CN | 104924288 | 9/2015 |

(Continued)

OTHER PUBLICATIONS

International Search Report and Written Opinion dated Jul. 3, 2020 in International Patent Application No. PCT/US2019/060534.

(Continued)

*Primary Examiner* — Kyle O Logan
(74) *Attorney, Agent, or Firm* — Fitch, Even, Tabin & Flannery LLP

(57) ABSTRACT

An apparatus is disclosed including a robotic system having a robotic picking workstation, tote storage and retrieval and transit decks. The system has bots that autonomously transport totes from the storage and retrieval system to the robotic picking workstation via the transit decks. The robotic picking workstation may have a picking lane where a robotic handler transports eaches from totes on the bots to order totes in the workstation. The robotic picking workstation further has a queuing buffer where bots are cued for the picking lane.

20 Claims, 21 Drawing Sheets

Related U.S. Application Data

(60) Provisional application No. 62/758,416, filed on Nov. 9, 2018.

(51) Int. Cl.
*B65G 1/06* (2006.01)
*B65G 47/68* (2006.01)
*B65G 47/90* (2006.01)

(56) References Cited

U.S. PATENT DOCUMENTS

| | | | |
|---|---|---|---|
| 9,952,589 | B1 | 4/2018 | Brazeau |
| 10,471,597 | B1 | 11/2019 | Murphy |
| 10,589,932 | B1 | 3/2020 | Theobald |
| 10,741,597 | B2 | 8/2020 | Nakashikiryo et al. |
| 2012/0330458 | A1* | 12/2012 | Weiss ............... B66F 9/063 901/1 |
| 2014/0288696 | A1 | 9/2014 | Lert |
| 2015/0073589 | A1* | 3/2015 | Khodl .............. B65G 1/1375 700/218 |
| 2015/0291356 | A1 | 10/2015 | Oki et al. |
| 2016/0355337 | A1 | 12/2016 | Lert et al. |
| 2017/0066592 | A1* | 3/2017 | Bastian, II ............ B25J 5/02 |
| 2017/0107055 | A1 | 4/2017 | Magens et al. |
| 2017/0166399 | A1 | 6/2017 | Stubbs et al. |
| 2017/0313514 | A1* | 11/2017 | Lert, Jr. ............. B65G 1/0492 |
| 2018/0057263 | A1 | 3/2018 | Beer |
| 2018/0201439 | A1 | 7/2018 | Battles et al. |
| 2018/0265297 | A1 | 9/2018 | Nakano et al. |
| 2018/0267904 | A1 | 9/2018 | Kurian |
| 2018/0284760 | A1* | 10/2018 | Gupta ................ B25J 13/065 |
| 2018/0305122 | A1* | 10/2018 | Moulin .............. B65G 1/0492 |
| 2019/0177095 | A1 | 6/2019 | Ukisu |
| 2019/0359424 | A1 | 11/2019 | Avraham |
| 2020/0017317 | A1 | 1/2020 | Yap et al. |
| 2022/0234209 | A1 | 7/2022 | Kriveshko |

FOREIGN PATENT DOCUMENTS

| | | |
|---|---|---|
| CN | 107472787 | 12/2017 |
| CN | 206719255 | 12/2017 |
| CN | 108349652 | 7/2018 |
| CN | 108408316 | 8/2018 |
| CN | 108495798 | 9/2018 |
| CN | 113226951 | 7/2023 |
| EP | 3877301 | 9/2021 |
| JP | A612603 | 1/1986 |
| JP | 2018087083 | 6/2018 |
| JP | 2018517646 | 7/2018 |
| JP | 2022508070 | 1/2022 |
| TW | 1758656 | 3/2022 |
| WO | 2016014917 | 1/2016 |
| WO | 2016130338 | 8/2016 |
| WO | 2017098153 | 6/2017 |

OTHER PUBLICATIONS

International Search Report and Written Opinion dated Oct. 5, 2020 in International Patent Application No. PCT/US2019/060534.
Office Action dated Dec. 14, 2020 in Taiwan Patent Application No. 108140642.
English language Abstract for CN107472787 published Dec. 15, 2017.
English language Abstract for CN108349652 published Jul. 31, 2018.
English language Abstract for CN108495798 published Sep. 4, 2018.
English language Abstract for JP2018087083 published Jun. 7, 2018.
Response to Office Action filed Jun. 15, 2021, with English language translation of amendments made therein, in Taiwan Patent Application No. 108140642.
Response to Office Action filed Dec. 17, 2021 in European Patent Application No. 19839288.8.
Office Action dated Jun. 7, 2022 in Chinese Patent Application No. 201980085429.6.
Office Action dated Jul. 4, 2022 in Japanese Patent Application No. 2021-525080.
Response to Office Action dated Dec. 22, 2022, with English translation of Claims as amended therein, in Chinese Patent Application No. 201980085429.6.
Response to Office Action dated Jan. 4, 2022, with English translation of Claims as amended therein, in Japanese Patent Application No. 2021-525080.
Office Action dated May 26, 2021 in U.S. Appl. No. 16/676,732.
Response to Office Action dated Nov. 26, 2021 in U.S. Appl. No. 16/676,732.
Final Office Action dated Mar. 3, 2022 in U.S. Appl. No. 16/676,732.
Response to Final Office Action dated Sep. 2, 2022 in U.S. Appl. No. 16/676,732.
Office Action dated Sep. 16, 2022 in U.S. Appl. No. 16/676,732.
Response to Office Action dated Jan. 13, 2022 in U.S. Appl. No. 16/676,732.
Notice of Allowance and Fee(s) Due dated Feb. 6, 2023 in U.S. Appl. No. 16/676,732.
CIPO; App. No. 201980085429.6; Notice of Allowance mailed Apr. 18, 2023; (7 pages).
TIPO; App. No. 108140642; Notice of Allowance mailed Dec. 30, 2021; (6 pages).
JPO; App. No. 2021-525080; Office Action mailed Mar. 25, 2024; (pp. 1-13).

* cited by examiner

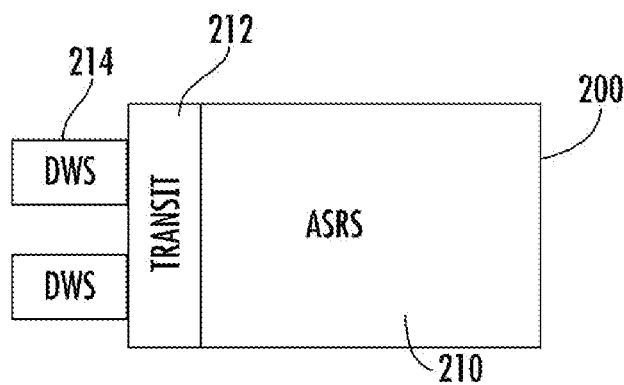
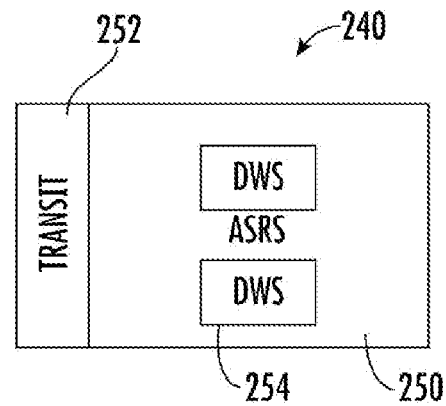
FIG. 5A    FIG. 5B
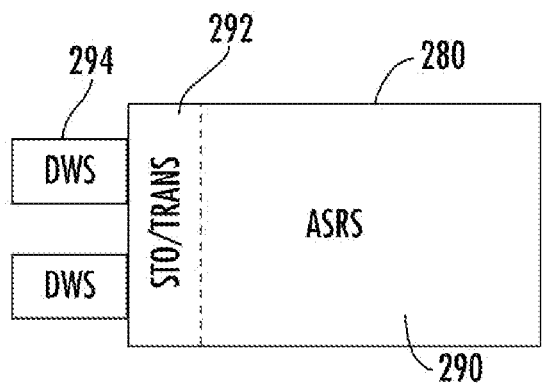
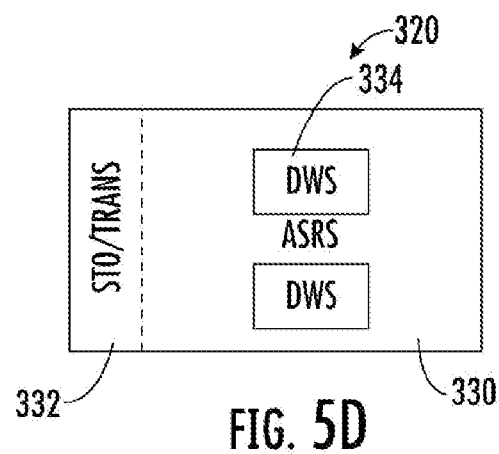
FIG. 5C    FIG. 5D
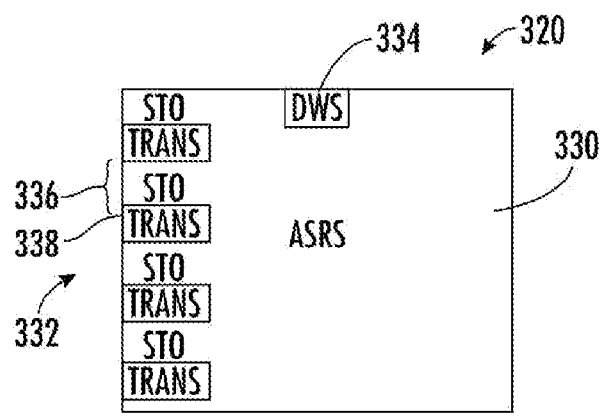
FIG. 5E

SYSTEM HAVING ROBOTIC WORKSTATION

PRIORITY CLAIM

The present application is a continuation of U.S. patent application Ser. No. 16/676,732, filed on Nov. 7, 2019, entitled "SYSTEM HAVING ROBOTIC WORKSTATION," to be issued as U.S. Pat. No. 11,623,826 on Apr. 11, 2023, which application claims priority to U.S. Provisional Patent Application No. 62/758,416, filed on Nov. 9, 2018, entitled "SYSTEM HAVING ROBOTIC WORKSTATION," which applications are incorporated by reference herein in their entirety.

BACKGROUND

Technical Field

The exemplary and non-limiting embodiments relate generally to systems having picking workstations and automatic storage and retrieval for use in material handling, for example in e-commerce or storage and retrieval.

Brief Description of Prior Developments

Workstation examples may be found in the following U.S. patents (which are hereby incorporated by reference in their entireties): U.S. Pat. No. 9,139,363 which discloses an automated system for transporting payloads; U.S. Pat. Nos. 10,435,241; and 11,142,398.

SUMMARY

The following summary is merely intended to be exemplary. The summary is not intended to limit the scope of the claims.

In accordance with one aspect, an example is provided in an apparatus comprising a robotic system having a robotic picking workstation, tote storage and retrieval and transit decks. The system has bots that autonomously transport totes from the storage and retrieval system to the robotic picking workstation via the transit decks. The robotic picking workstation has a picking lane where a robotic handler transports eaches from totes on the bots to order totes in the workstation. The robotic picking workstation further has a queuing buffer where bots are cued for the picking lane.

In accordance with another aspect, the robotic picking workstation has multiple levels where incoming bots flow into the workstation on a first level and outgoing bots flow out of the workstation on a second level.

In accordance with another aspect, the robotic picking workstation robotic handler comprises a gantry based robotic handler.

In accordance with another aspect, the present technology relates to an automatic storage and retrieval system, comprising: storage shelves for storing containers; mobile robots for transferring containers around within the automatic storage and retrieval system; and a workstation comprising: a first end at which a mobile robot enters the workstation carrying a product container, a second end, opposite the first end, at which the mobile robot exits the workstation, at least one order container, positioned to at least one side of the mobile robot as the mobile robot moves between the first and second ends of the workstation, and an automated picker robot for transferring items from the product container to at least one order container as the mobile robot moves between the first and second ends of the workstation.

In accordance with another aspect, the present technology relates to a workstation configured for use with a mobile robot within an automatic storage and retrieval system, the workstation comprising: a first end at which a mobile robot enters the workstation carrying a product container, a second end, opposite the first end, at which the mobile robot exits the workstation, at least one order container within the workstation, and an automated picker robot for transferring items from the product container to at least one order container as the mobile robot moves between the first and second ends of the workstation.

In accordance with another aspect, the present technology relates to a workstation configured for use with mobile robots within an automatic storage and retrieval system, the workstation comprising: a first end at which a set of first mobile robots enter the workstation, each of the first mobile robots of the set of first mobile robots carrying a product container; at least one order container; and an automated picker configured to pick items from the product containers on the set of first mobile robots, as the first set of mobile robots move through the workstation, and transfer the items to the at least one order container.

In accordance with another aspect, the present technology relates to a workstation configured for use with mobile robots within an automatic storage and retrieval system, the workstation comprising: a set of shelves configured to store a plurality of order containers; a picking lane adjacent the set of shelves and extending from one end of the workstation to an opposite end of the workstation, mobile robots comprising product containers moving along the picking lane; and an automated picker configured to pick items from the product containers on the mobile robots and transfer the items to the plurality of order containers on the shelves as the mobile robots move through the workstation along the picking lane.

In accordance with another aspect, the present technology relates to a workstation configured for use with a mobile robot within an automatic storage and retrieval system, the workstation comprising: a first end at which the mobile robot enters the workstation carrying a product container; and a mobile workstation robot configured to move within the workstation, the mobile workstation robot comprising an automated picker for transferring items from the product container of the mobile robot to an order container.

BRIEF DESCRIPTION OF THE DRAWINGS

FIG. 5A shows a plan view of an exemplary system having a multilevel storage structure;

FIG. 5B shows a plan view of an exemplary system having a multilevel storage structure;

FIG. 5C shows a plan view of an exemplary system having a multilevel storage structure;

FIG. 5D shows a plan view of an exemplary system having a multilevel storage structure;

FIG. 5E shows a side view of an exemplary system having a multilevel storage structure;

DETAILED DESCRIPTION

Embodiments of the present technology will now be described with reference to the figures, which in general relate to a robotic dynamic workstation.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±0.25%.

Figure 1A:
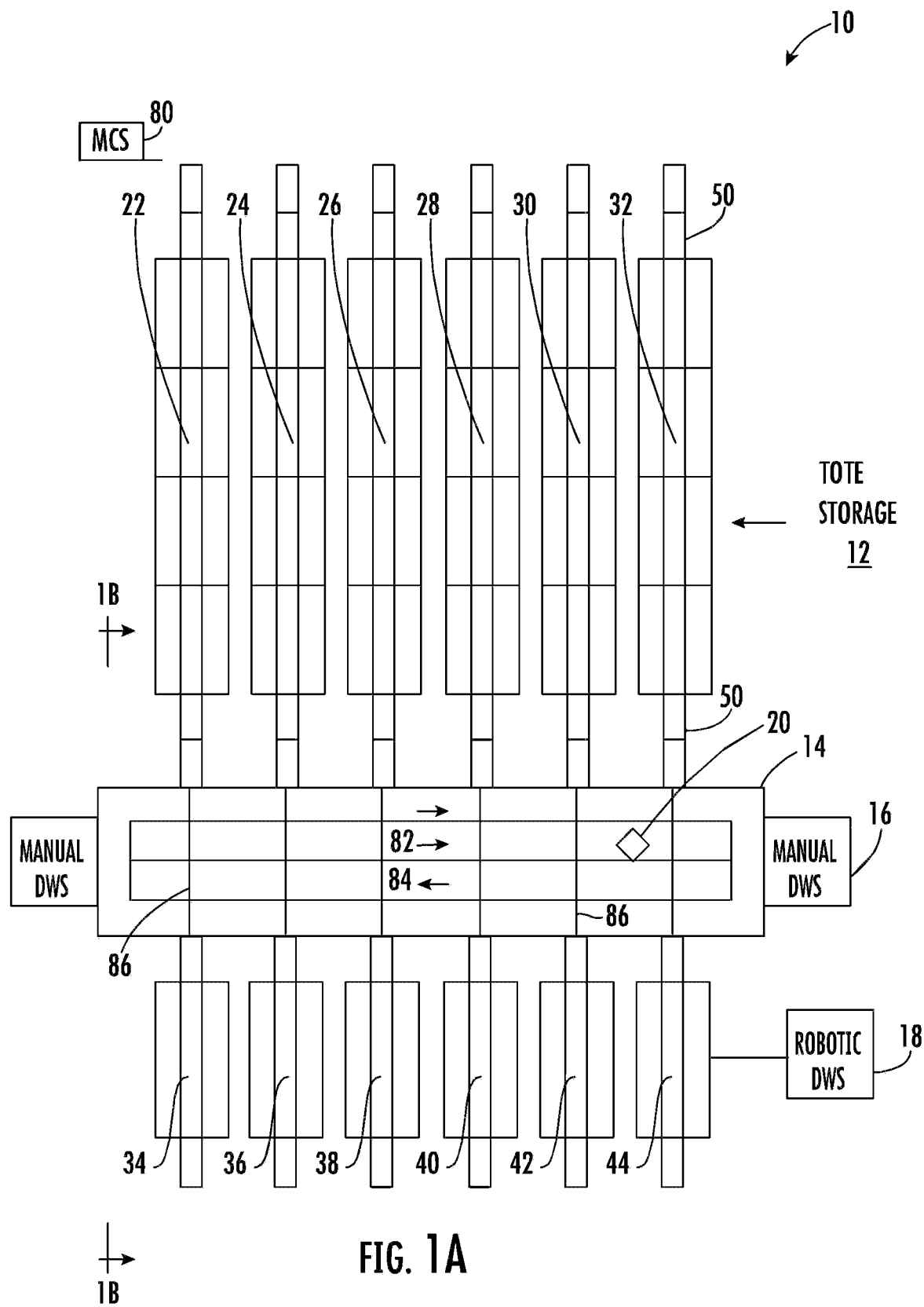
FIG. 1A shows a schematic plan a view of a system having a picking-workstation.
Figure 1B:
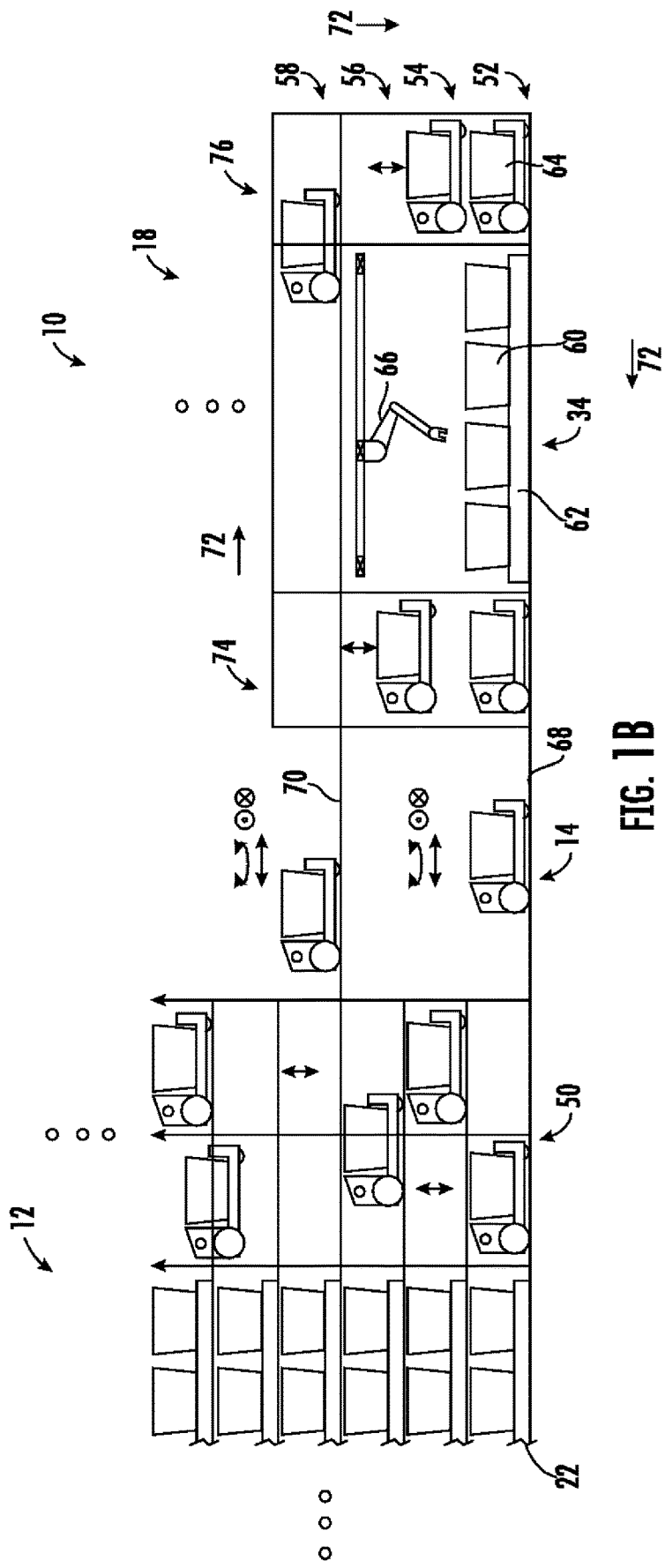
FIG. 1B shows a partial section view of the system of FIG. 1.

FIG. 1A illustrates a schematic plan view of system 10 having a picking-workstation suitable for achieving a high percentage of robot or automatically pickable SKUs. In the exemplary embodiment, workstation traffic and storage/retrieval traffic do not interfere with each other excessively and limit throughput at peak. Referring also to FIG. 1B, there is shown a partial section view of system 10. The topology of system 10 is intended to be exemplary and more or less sub modules or systems of system 10 may be arranged in any number of ways. By way of non-limiting example, the topology as disclosed in U.S. Pat. No. 11,142,398 which is incorporated by reference herein in its entirety, may be employed but with a much higher workstation density and a leaned-down transit deck. FIG. 1A shows system 10 plan view with tote storage 12, transit decks 14, manual dynamic workstations 16, robotic dynamic workstations 18 and bots 20. Tote storage array 12 has six storage aisles 22, 24, 26, 28, 30, 32, and verticals 50 at opposing ends of the aisles. Each aisle allows bots 20 to transit from end to end where bots 20 may pick or place totes on opposing sides of the aisle for storage or retrieval. Verticals 50 are provided to allow bots 20 to selectively climb up or down to transit from level to level of storage array 12 or transit decks 14. Robotic dynamic workstation 18 has six workstation aisles 34, 36, 38, 40, 42, 44, each with a single elongated bay to allow more than 6 totes per shelf although less may be provided (for example, 4 as seen in FIG. 1B). Each workstation effectively uses four storage levels 52, 54, 56, 58 as its working envelope. The bottom level 52 may be the picking lane, where the order totes 60 are held on shelves 62 while product bots 64 flow through and donate eaches or subtotes picked by the cartesian robot 66. This is also the exit lane 52, because as soon as the pick is complete, the product bot 64 will exit the workstation 34 onto the lower transit deck 68 and travel to its next storage location. The second level 54 is the clearance space occupied by the picked payload (each or subtote) as it moves from source to destination tote, and the third level 56 is occupied by the cartesian robot mechanism. The fourth level 58 is the entry lane and queuing buffer. The exemplary topology preserves a 2-elevation 68, 70 architecture and unidirectional 72 bot flows. In alternate aspects the bot flow may be opposite or bi-directional. Here, though, the bots may flow through workstation 34 from top to bottom, entering at workstation level 4 (70, 58) from the vertical tower 74 adjacent to the transit deck 70 and queuing up behind bots already in queue. At the end of that lane, the bot would enter the vertical tower 76 and drop down to workstation level 1 (68, 52). When commanded by MCS 80 (Master Control System), the bot enters the picking lane and drives forward to position itself next to the target destination tote. The cartesian robot 66 then (or in parallel) moves to the bot, extracts the target each or subtote and places it into the target tote/subtote. As with a manual station 16, as soon as the robot 66 end-arm-effector clears the product tote 60, the Alphabot 64 robot moves on and exits the picking lane onto the transit deck 68 so that the next product bot can move to its position, overlapping the put-away move by the picking robot. One more empty level per workstation tier may be provided, for a total of 5 levels per tier, in order to provide adequate maintenance clearance on the top transit deck 70 there would be 2-levels (roughly 30") separating the top transit deck of a lower workstation tier and the bottom transit deck of an upper workstation (not shown—above workstation 34). By way of example, three workstation tiers may be provided in 15 storage levels, requiring roughly 20' clear height. By way of further example, a 15-level, 6-aisle system configured as shown in FIGS. 1A & 1B may support a total of 18 workstations along a deck that's only about 100' in length. Here with an average sustained pick rate of 400 eaches per hour per workstation, these 18 workstations would pick a total of 7,200 eaches per hour. As bots would be queuing for the workstation within the workstation aisles and not on the deck, a high rate of bot flow on the deck may be provided, with two one-way avenues 82, 84 serving as main east-west arteries, and the streets 86 allowing crossing over the deck to enter an aisle. Here, the only stopping on the deck may be by bots on streets yielding right of way to bots on the avenues. Further, as bots normally do not park in queue on the deck, the streets and aisles may be aligned. In alternate aspects, dedicated decks may be provided, for example, a deck may be placed between decks 68, 70 that is dedicated to either streets or avenues where similarly decks 68, 70 may be dedicated such that streets are dedicated on one level and avenue(s) on a different level. Here, levels may be provided to minimize traffic congestion of the bots. Manual workstations 16 may be provided the ends of the transit decks 14. Sequencing the flow of bots through the pick may be largely unconstrained by having multiple order totes active concurrently. With three levels between the entry 52 and exit 58 levels of each workstation tier, a single express deck may be provided within each workstation tier, positioned midway between workstation levels 2 (54) and 3 (56), and running across the front of the storage aisles, sufficient to keep dispense and replenishment traffic separate from picking traffic.

Figure 2:
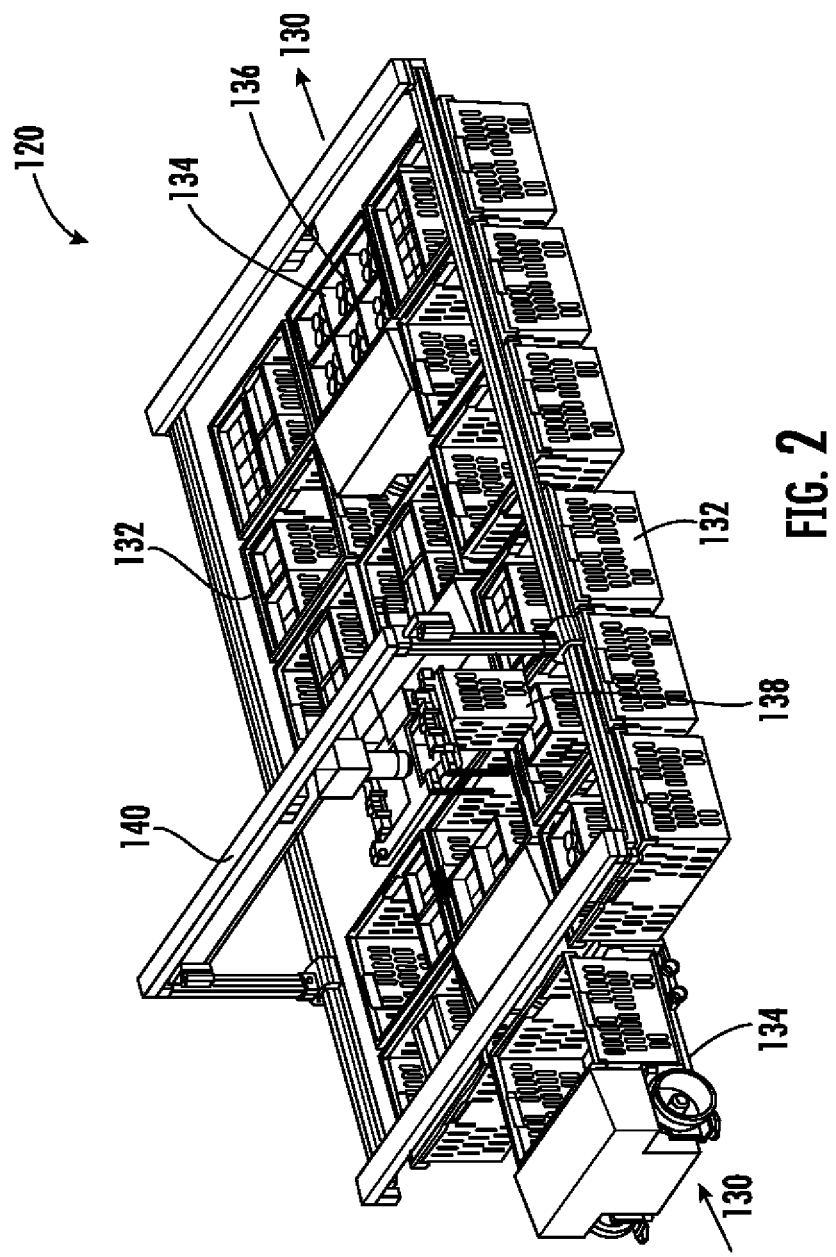
FIG. 2 shows an isometric view of a cartesian robotic workstation.
Figure 3:
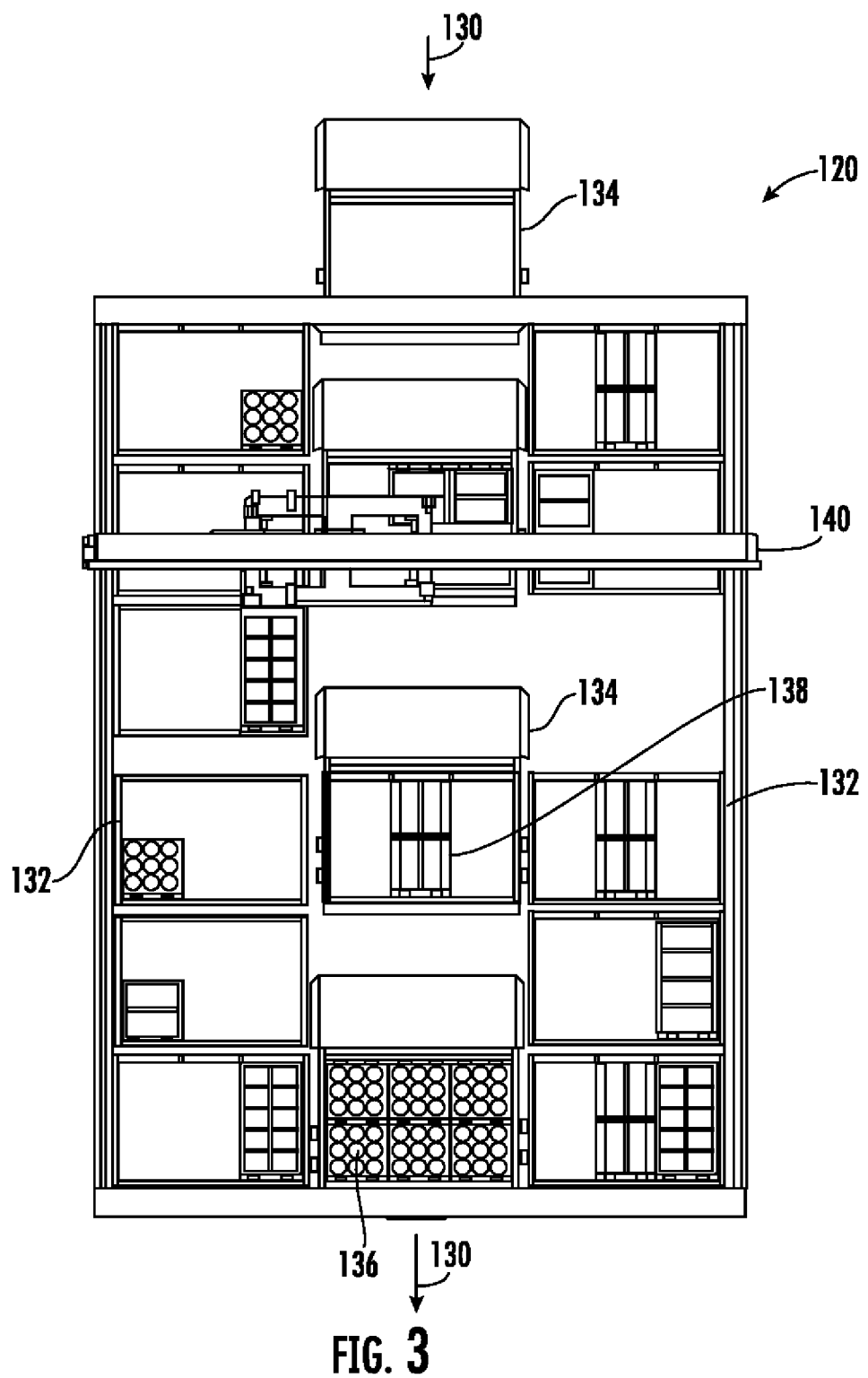
FIG. 3 shows a top view of a cartesian robotic workstation.
Figure 4:
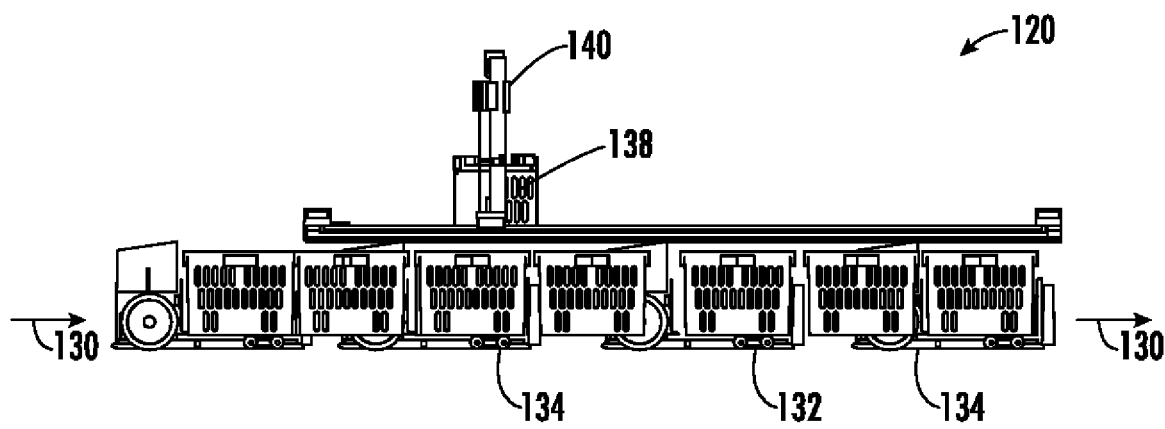
FIG. 4 shows a side view of a cartesian robotic workstation.

Referring now to FIG. 2, there is shown an isometric view of a cartesian robotic workstation 120 suitable for use in a robotic dynamic workstation, for example as shown in FIG. 1. Alternately cartesian robotic workstation 120 may be directly integrated within a tote storage structure, for example, on the top level or within levels of the tote storage structure shown in FIG. 1. Referring also to FIGS. 3 and 4, there is shown top and side views respectively of workstation 120. Workstation 120 has a picking lane 130, where the order totes 132 are held on shelves while product bots 134 flow through and donate eaches 136 or subtotes 138 picked by the cartesian robot 140. Cartesian robot 140 is shown with exemplary tooling to pick totes and may have features as disclosed in U.S. Pat. No. 10,815,057, which application is incorporated by reference herein in its entirety. Portions of this application are set forth below. Alternately, robot 140 may have suitable tooling to pick and place eaches or to pick and place both eaches and subtotes. Alternately cartesian robot 140 may be one or more multi degree of freedom articulated arm(s) with suitable tooling where the articulated arm(s) may be mounted stationary with respect to the product totes or may be mounted on one or more gantries, shuttles stages or otherwise with respect to the product totes. Lane 130 serves as an entry and exit lane, where as soon as pick from a product tote for placement in an order tote is complete, the product bot 134 may exit the workstation 120, for example, onto a transit deck or storage lane and travel to its next storage location. Clearance space is provided above the product and order totes occupied by the picked payload (each or subtote) as it moves from source tote to destination tote. The area above the clearance space is occupied by the cartesian robot mechanism. In this embodiment, the bots would flow through the workstation from entry to exit where at either end the bots can further place spent product totes and pick product totes to fulfill the next each within the storage structure and can enter lanes, towers and drop up or down or transit decks such that the bots can autonomously access any portion of the tote storage structure. When commanded by MCS, the bot 134 enters the picking lane 130 and drives forward to position itself next to the target destination tote. The cartesian robot 140 then moves to the bot, extracts the target each or subtote and places it into the target tote/subtote. Just as with the manual station, as soon as the robot end-arm-effector clears the product tote, the product bot robot moves on and exits the picking lane onto the transit deck so that the next product bot can move to its position, overlapping the put-away move by the picking robot. In alternate aspects the bot enters the picking lane and drives forward where the cartesian robot tracks movement of the bot while both are still in motion, dynamically extracts the target each or subtote and places it into the target tote/subtote. Although a single gantry and pick/place robot are shown, more may be provided within the workstation.

Referring now to FIG. 5A, there is shown a plan view of exemplary system 200 having multilevel storage structure 210, multilevel transit decks 212 positioned adjacent to multilevel storage structure 210 and workstations 214 positioned adjacent to multilevel transit decks 212. The features of exemplary system shown in FIG. 5A may be as disclosed with respect to FIGS. 1A and 1B. Referring also to FIG. 5B, there is shown a plan view of exemplary system 240 having multilevel storage structure 250, multilevel transit decks 252 positioned adjacent to multilevel storage structure 250 and workstations 254 positioned on top of or within multilevel storage structure 210. By way of example, the features of the exemplary system shown in FIG. 5B may incorporate the workstation features disclosed with respect to FIGS. 1A, and 2-4. Here, the workstation may be embedded within the tote storage structure. Referring also to FIG. 5C, there is shown a plan view of exemplary system 280 having multilevel storage structure 290, multilevel transit decks and storage structure 292 positioned adjacent to & within multilevel storage structure 290 and workstations 294 positioned adjacent to multilevel transit decks and storage structure 292. The multilevel transit decks and storage structure 292 may have for example three storage levels above each transit deck level, for example as seen in FIG. 5E. By way of example, the features of the exemplary system shown in FIG. 5C may incorporate the workstation features disclosed with respect to FIGS. 1A, and 2-4. Here, the workstation may be adjacent to or embedded within the tote storage structure. Referring also to FIGS. 5D and 5E, there are shown plan and side views respectively of exemplary system 320 having multilevel storage structure 330, multilevel transit decks and storage structure 332 positioned adjacent to & within multilevel storage structure 330 and workstations 334 positioned within storage structure 330. The multilevel transit decks and storage structure 332 may have for example three storage levels 336 above each transit deck level 338. By way of example, the features of the exemplary system shown in FIGS. 5D and 5E may incorporate the workstation features disclosed with respect to FIGS. 1A, and 2-4. Here, the workstation may be embedded within the tote storage structure.

Figure 5F:
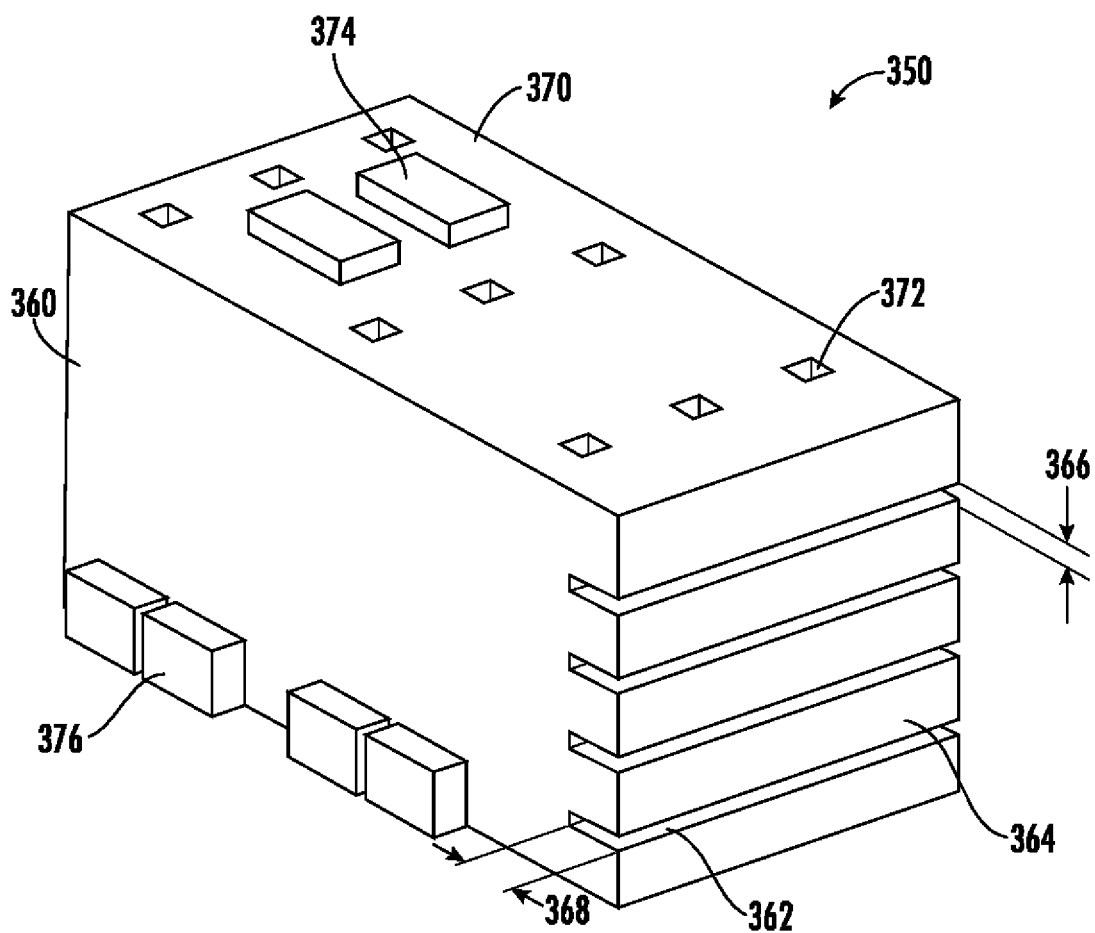
FIG. 5F shows an isometric view of exemplary system 350 having multilevel storage structure.

Referring now to FIG. 5F, there is shown an isometric view of exemplary system 350 having multilevel storage structure 360, multilevel transit decks 362 and storage structure 364 positioned adjacent to & within multilevel storage structure 360 where multilevel transit decks 362 and storage structure 364 are stacked with respect to each other to increase storage density. Overhead space 366 and depth 368 are provided such that sufficient overhead space 366 provides headroom for bots to pass and be serviced and depth 368 provides space for bots to move from aisle to aisle without creating bot interference or excessive traffic congestion. The features of exemplary system 350 shown in FIG. 5F may be as disclosed with respect to FIGS. 1A and 1B. In the exemplary embodiment system 350, the upper level 370 is shown as also being a transit deck where verticals 372 are provided to allow bots to selectively access different levels of storage structure 360 and traverse transit deck 370. Workstations 374 are also provided on transit deck 370 and may have features as disclosed with respect to the workstation as disclosed in FIGS. 2-4 or otherwise. Static workstations 376 may also be provided for tote induction and removal for use in applications such as decant, order tote removal or otherwise.

Figure 6A:
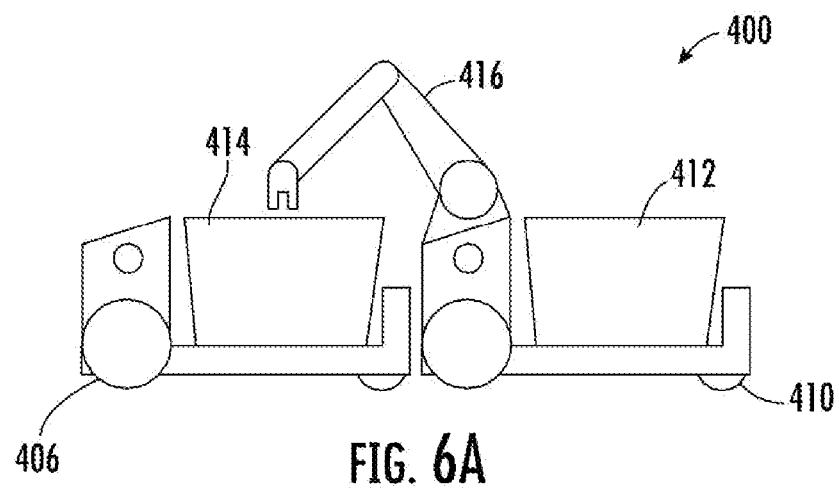
FIG. 6A shows a side view of an exemplary hybrid bot based workstation.
Figure 6B:
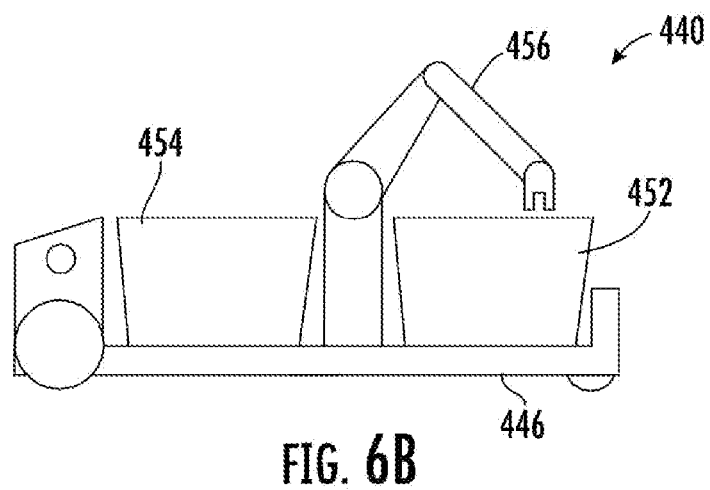
FIG. 6B shows a side view of an exemplary picker to goods bot based workstation.
Figure 6C:
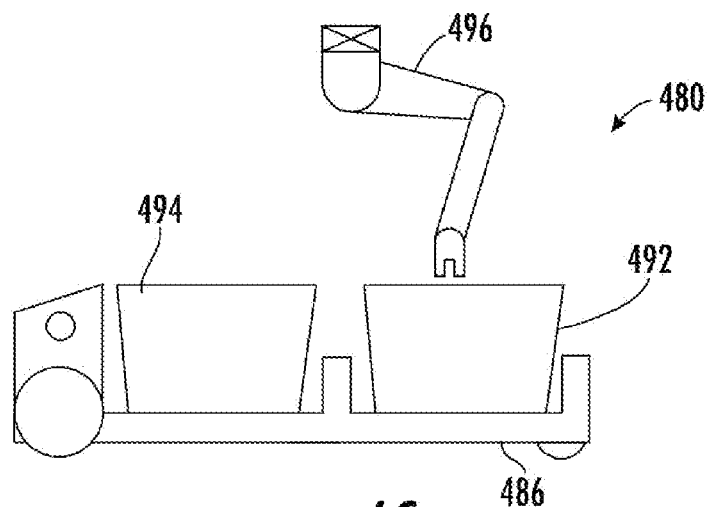
FIG. 6C shows a side view of an exemplary alternate hybrid bot based workstation.

Referring now to FIG. 6A, there is shown a schematic side view of bot based workstation 400 or hybrid workstation 400 having bots 406 and 410. In the embodiment shown, the bots may be autonomous where one bot may have an order tote 412 and the other a product tote 414. One of the bots, in the example shown bot 410 has an articulated arm or robot 416 provided to pick eaches from the product tote 414 and place the each into order tote 412. Here, bot 410 may for example travel through the storage and retrieval system autonomously optimally to engage bots with product totes until the desired mix of eaches in the order tote 412 is satisfied at which point bot 410 dispatches tote 412 for delivery to fulfill the order and picks up a new order tote to complete a subsequent order. Referring now to FIG. 6B, there is shown a schematic side view of bot based workstation 440 or picker to goods workstation 440 having single bot 446. In the embodiment shown, the bot may be autonomous and having two tote locations—an order tote 452 and a product tote 454. Bot 446 has an articulated arm or robot 456 provided to pick eaches from the product tote 454 and place the each into order tote 452. Here, bot 446 may for example travel through the storage and retrieval system autonomously optimally to engage tote storage locations, for example, removing product totes and picking the appropriate each until the desired mix of eaches in the order tote 452 is satisfied at which point bot 446 dispatches tote 452 for delivery to fulfill the order and picks up a new order tote to complete a subsequent order. Referring now to FIG. 6C, there is shown a schematic side view of bot based workstation 480 or alternate hybrid workstation 480 having single bot 486. In the embodiment shown, the bot may be autonomous and having two tote locations—an order tote 492 and a product tote 494. Bot 446 is adapted to be dispatched to an articulated arm or robot 496 provided to pick eaches from the product tote 494 and place the each into order tote 452. By way of example, robot 496 may have features as disclosed with respect to FIGS. 2-4. Here, bot 486 may for example travel through the storage and retrieval system autonomously optimally to engage tote storage locations, for example, removing product totes and travelling to robot 496 for picking the appropriate each until the desired mix of eaches in the order tote 492 is satisfied at which point bot 486 dispatches tote 492 for delivery to fulfill the order and picks up a new order tote to complete a subsequent order.

As noted above, workstation 120 has a picking lane 130, where the order totes 132 are held on shelves while product bots 134 flow through and donate eaches 136 or subtotes 138 picked by the cartesian robot 140. Cartesian robot 140 may have features as disclosed in U.S. Pat. No. 10,815,057, which application has been incorporated by reference herein in its entirety. FIGS. 7 to 19 illustrate a universal gripper 1010 mounted to a Cartesian robot 1050, which may be an example of Cartesian robot 140 mentioned above. The robot 1050 is driven along a pair of rails 1052 by a pair of motors 1054 (FIG. 9) on the robot 1050. For example, each rail 1052 may include toothed timing belt drives, driven by one through-shaft servo motor 1054. The through shaft is attached to the two parallel drives to ensure the two sides are driven uniformly.

Figure 7:
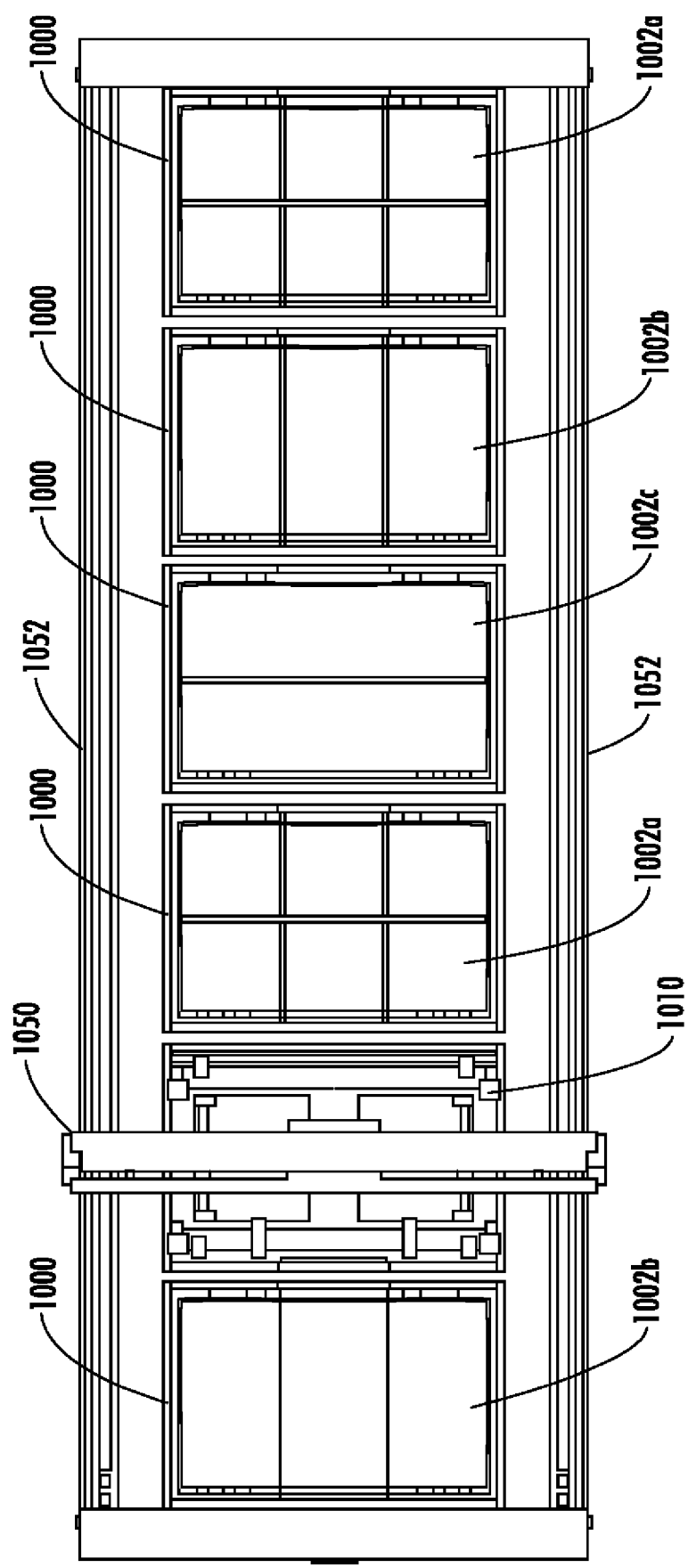
FIG. 7 is a top view of the universal gripper mounted on Cartesian robot.
Figure 8:
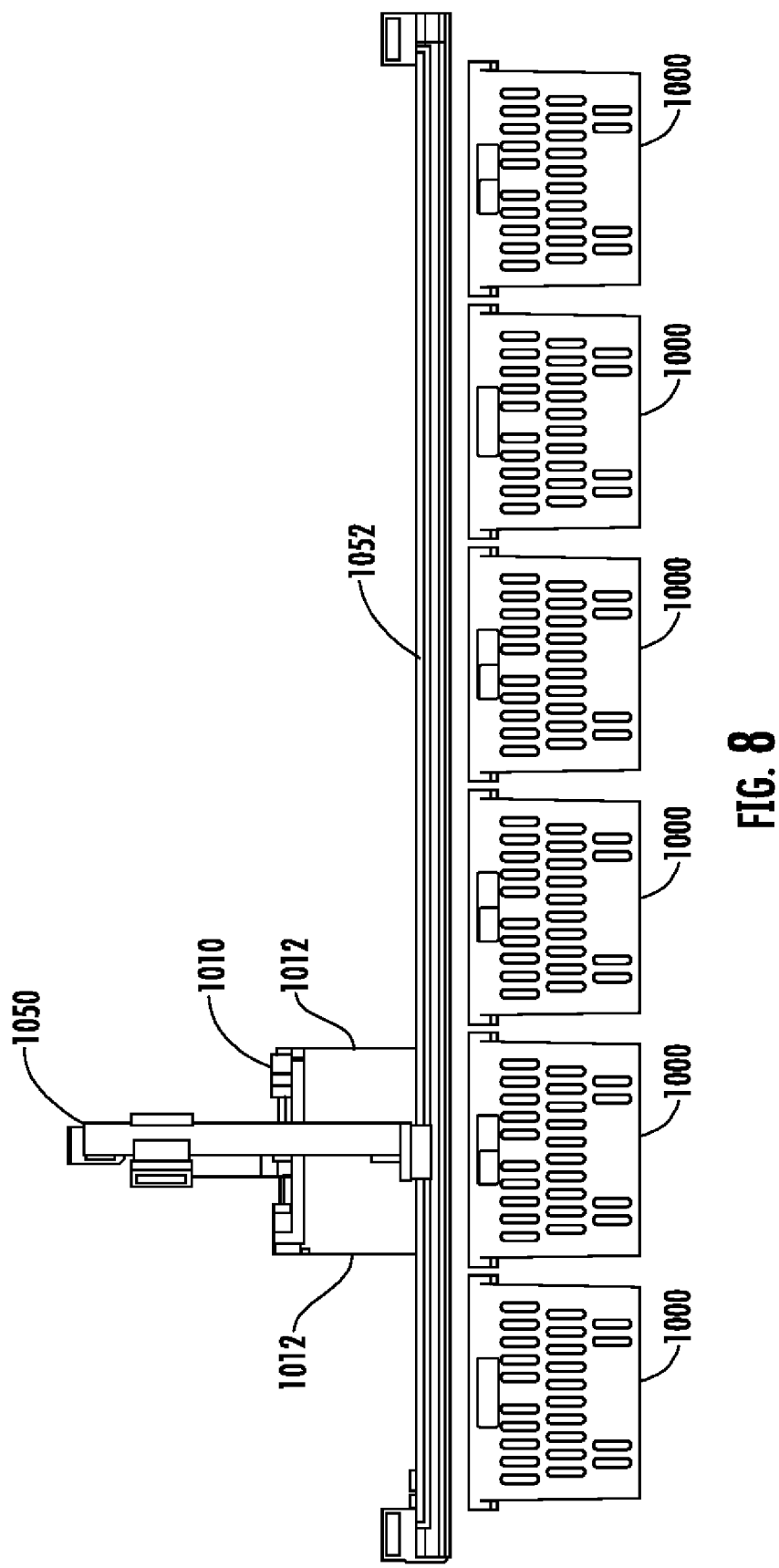
FIG. 8 is a front view of the universal gripper mounted on Cartesian robot.

The robot 1050 further includes a shaft 1058 which affixes within hub 1018 of the gripper 1010 to translate and/or rotate the gripper 1010. FIG. 7 is a top view of the robot 1050 and gripper 1010 over a number of totes 1000. FIG. 8 is a side view of the robot 1050 and gripper 1010 over a number of totes 1000. And FIGS. 9-19 are perspective views of the robot 1050 and gripper 1010 transferring a sub-tote 1002 from one tote to another tote. The Cartesian robot and gripper may be mounted within the storage racking to enable in-storage transfers of sub-totes between the full totes. This is used to defragment the storage; i.e. combine empty sub-totes together in full totes, and thereby increase storage density within the system.

Figure 9:
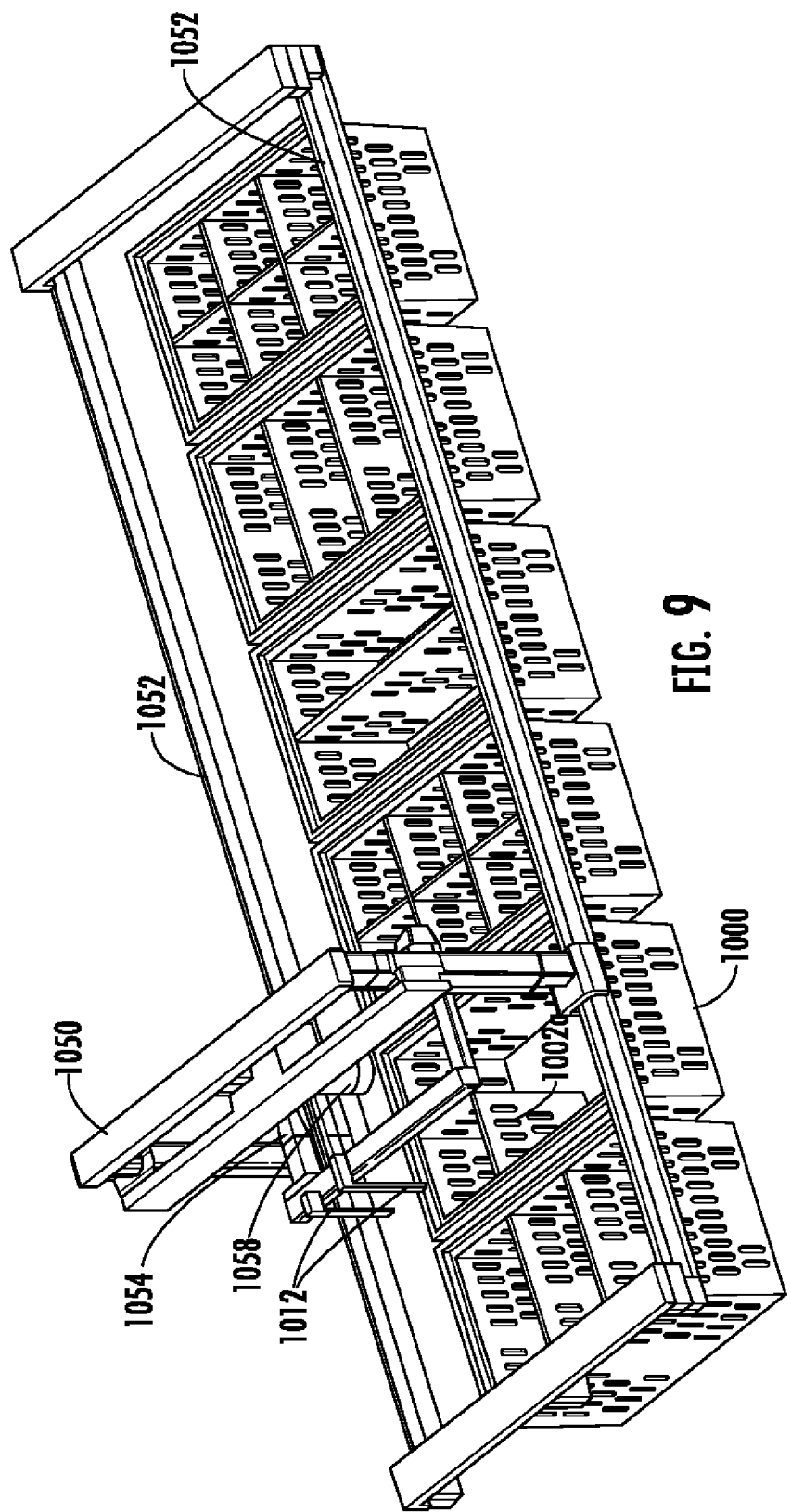
FIGS. 9-19 illustrate transfer of a sub-tote between full totes using a Cartesian robot.
Figure 10:
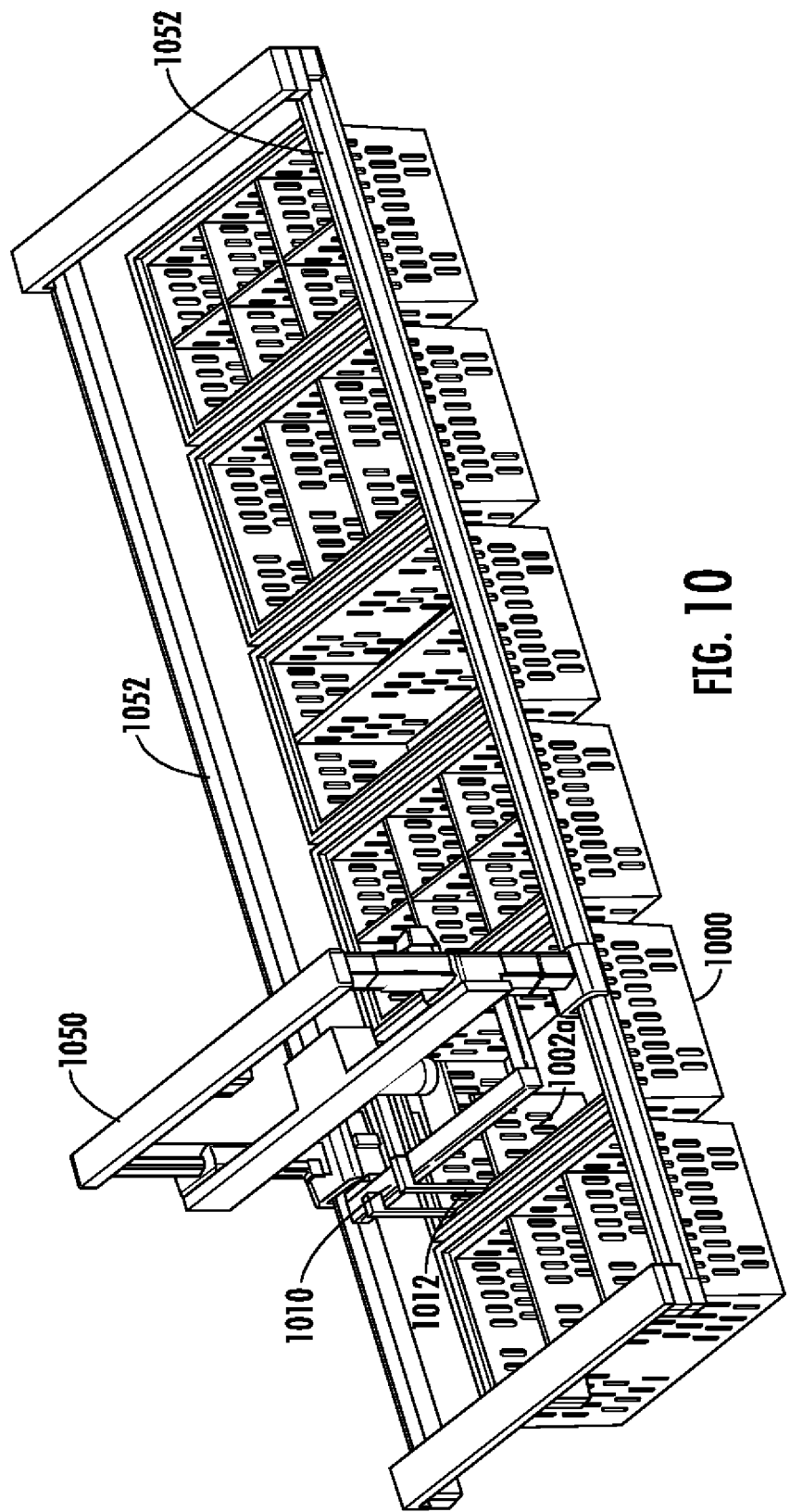
Figure 11:
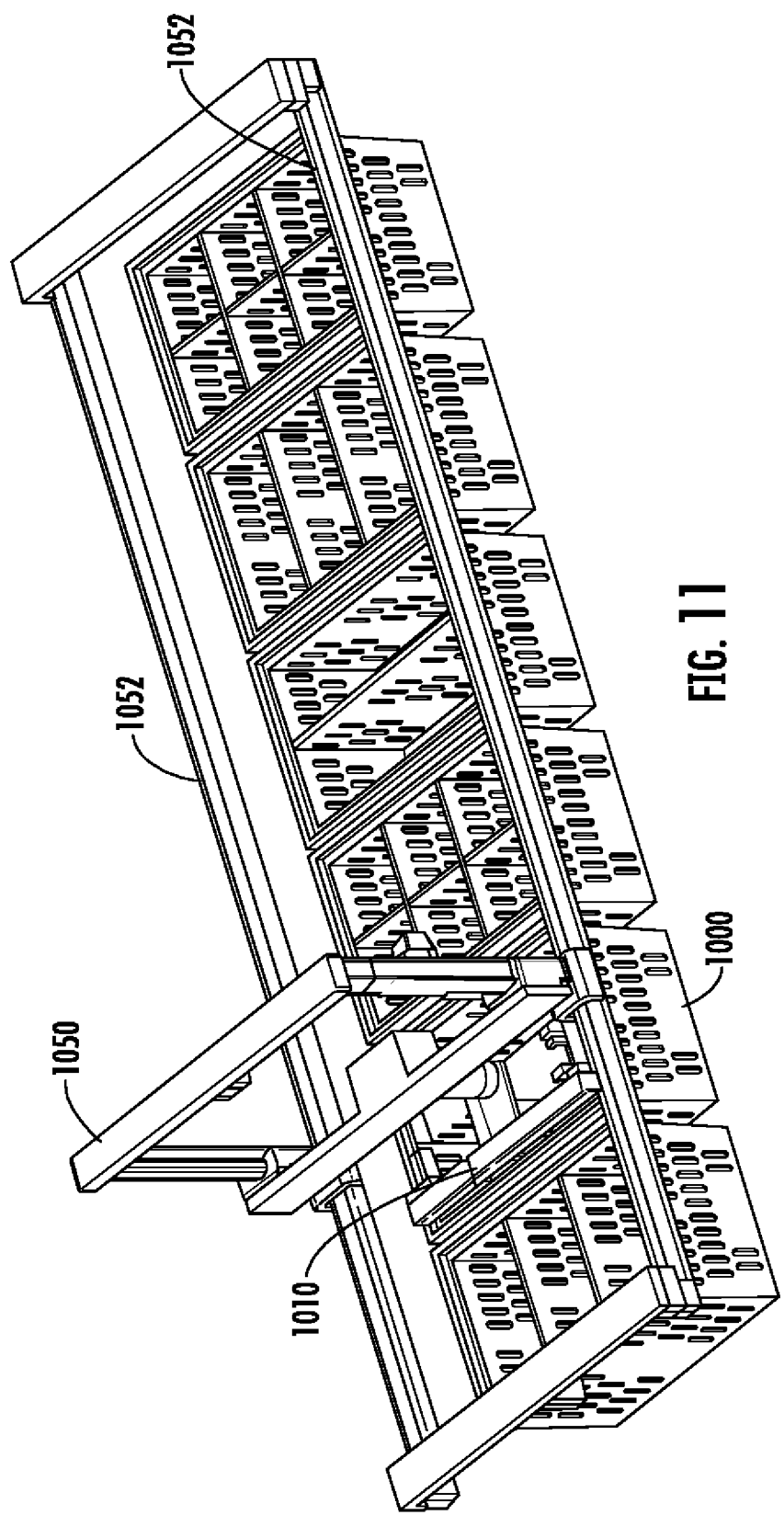

FIG. 9 shows the gripper 1010 in a fully raised position. Depending on tine length, gripper does not need to be raised to full height position when not carrying a sub-tote. FIG. 10 shows the gripper 1010 lowering its tines into slots in top exterior flange of a one-sixth sub-tote 1002a. FIG. 11 shows the first pair of gripper tines 1012 fully inserted into sub-tote slots, with the tines in sub-tote driven apart to position lifting tabs underneath the slots.

The figures also show a second one-sixth sub-tote 1002a in the position next to (or opposite) the sub-tote 1002a to be transferred. The second pair of gripper tines on the opposite side penetrate through the slots in the top exterior flanges of this opposite side sub-tote. However, the second pair of tines are not driven apart thereby allowing the second pair of tines to be lifted without lifting the opposite side sub-tote. If the one-sixth, or one-half sub-totes on opposite sides of the full tote are desired to be lifted together, then all tines are driven apart to position the lifting tabs underneath the top exterior flanges of both sub-totes.

Figure 12:
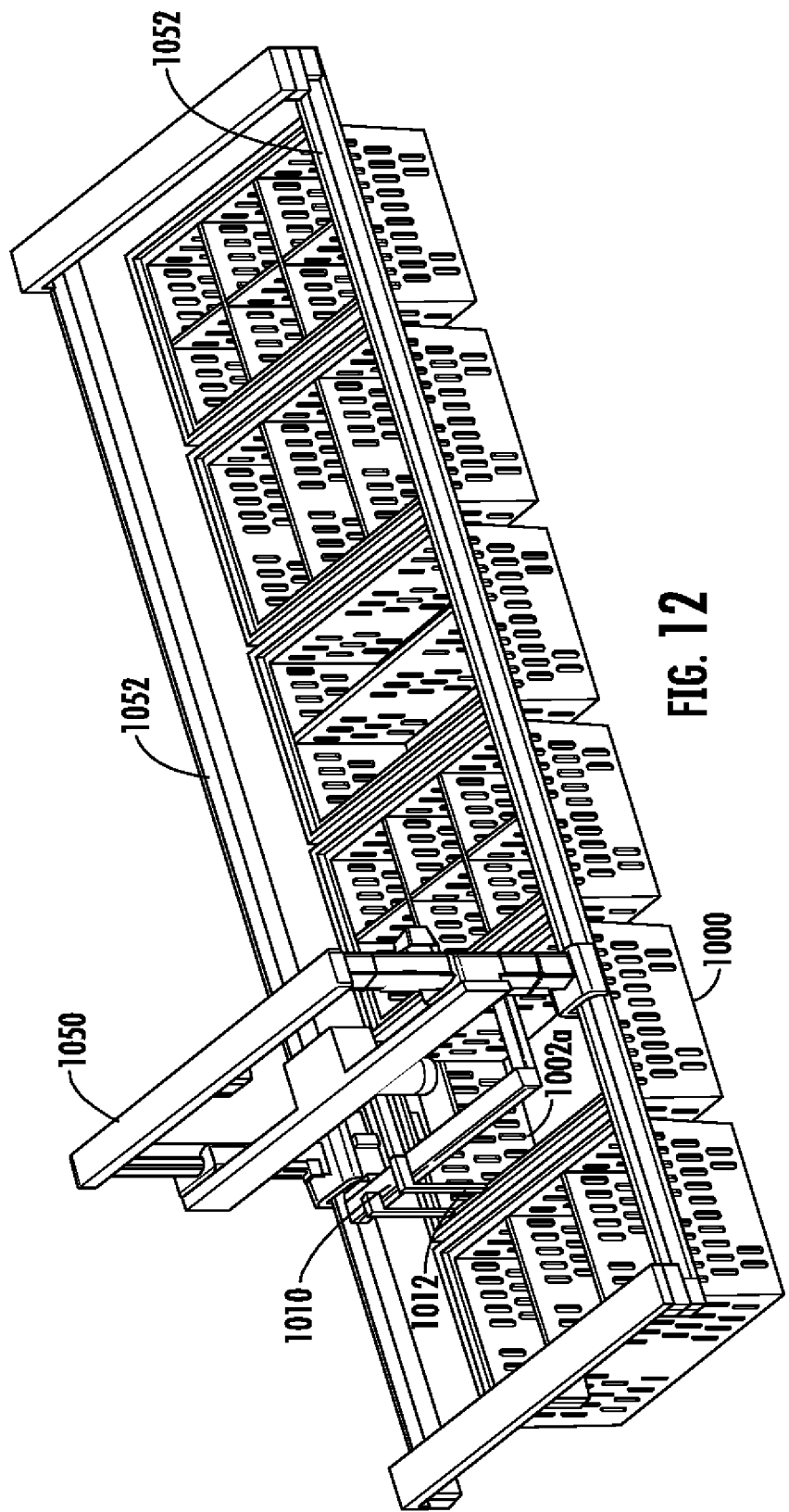
Figure 13:
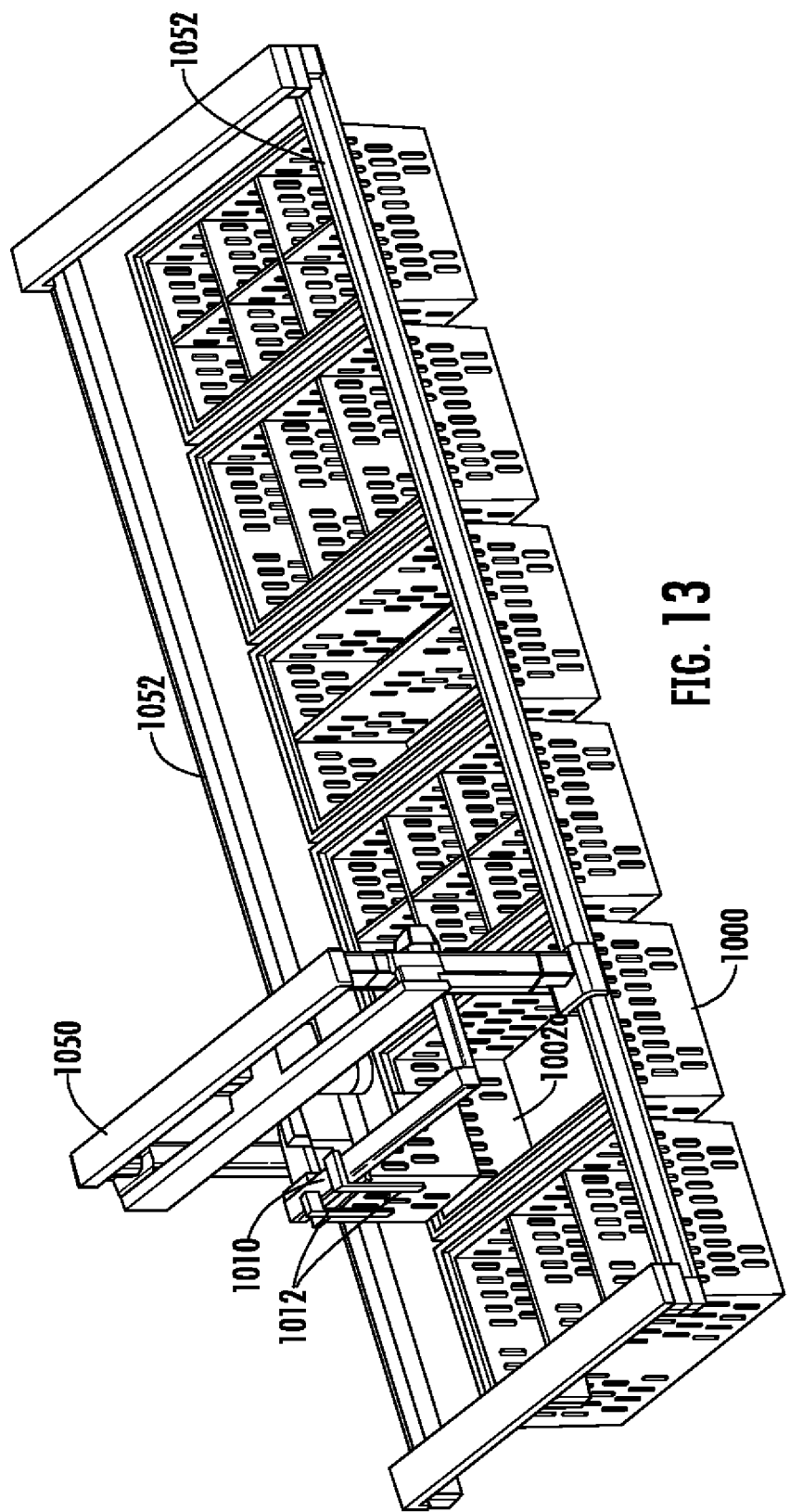
Figure 14:
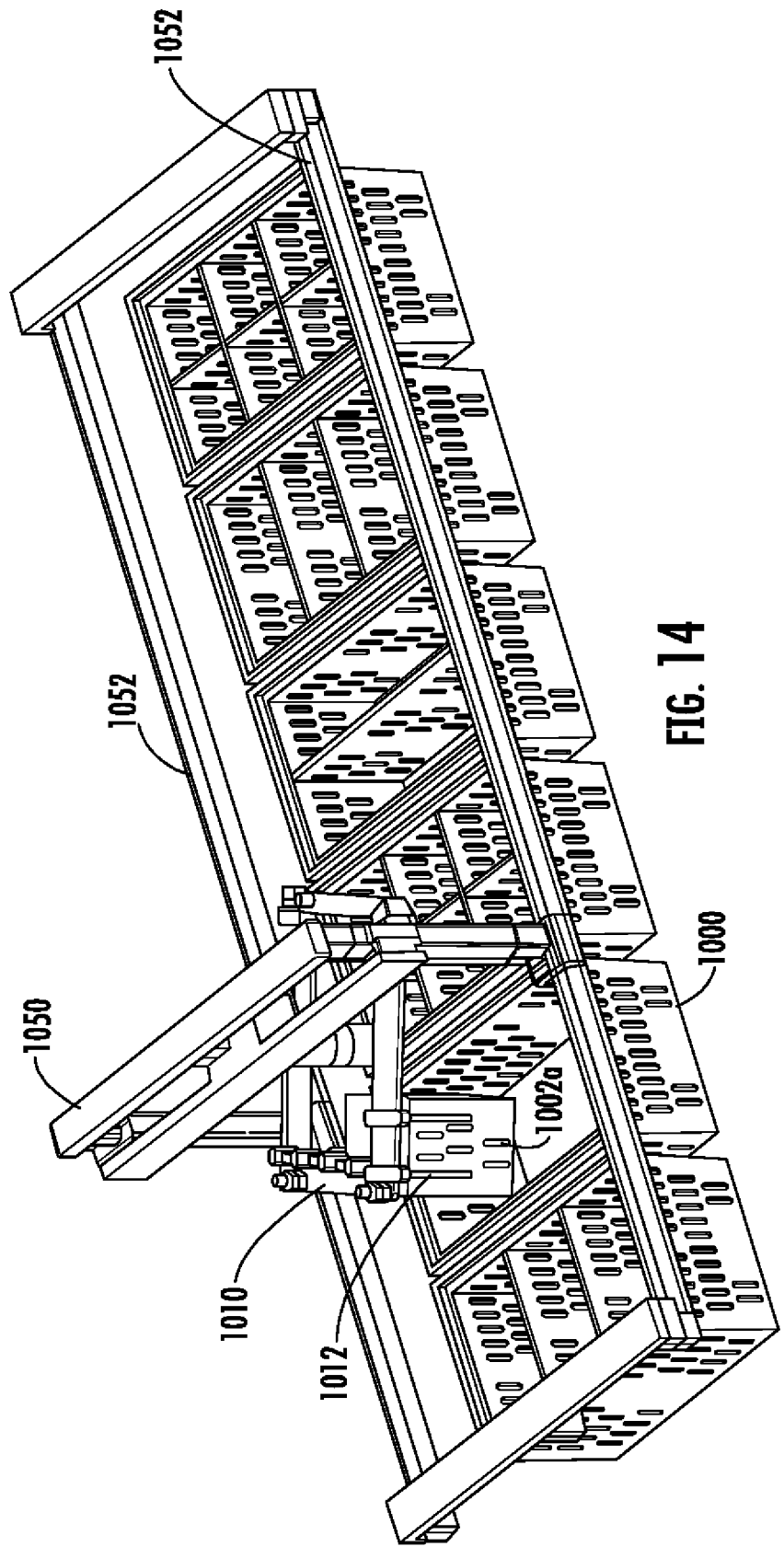
Figure 15:
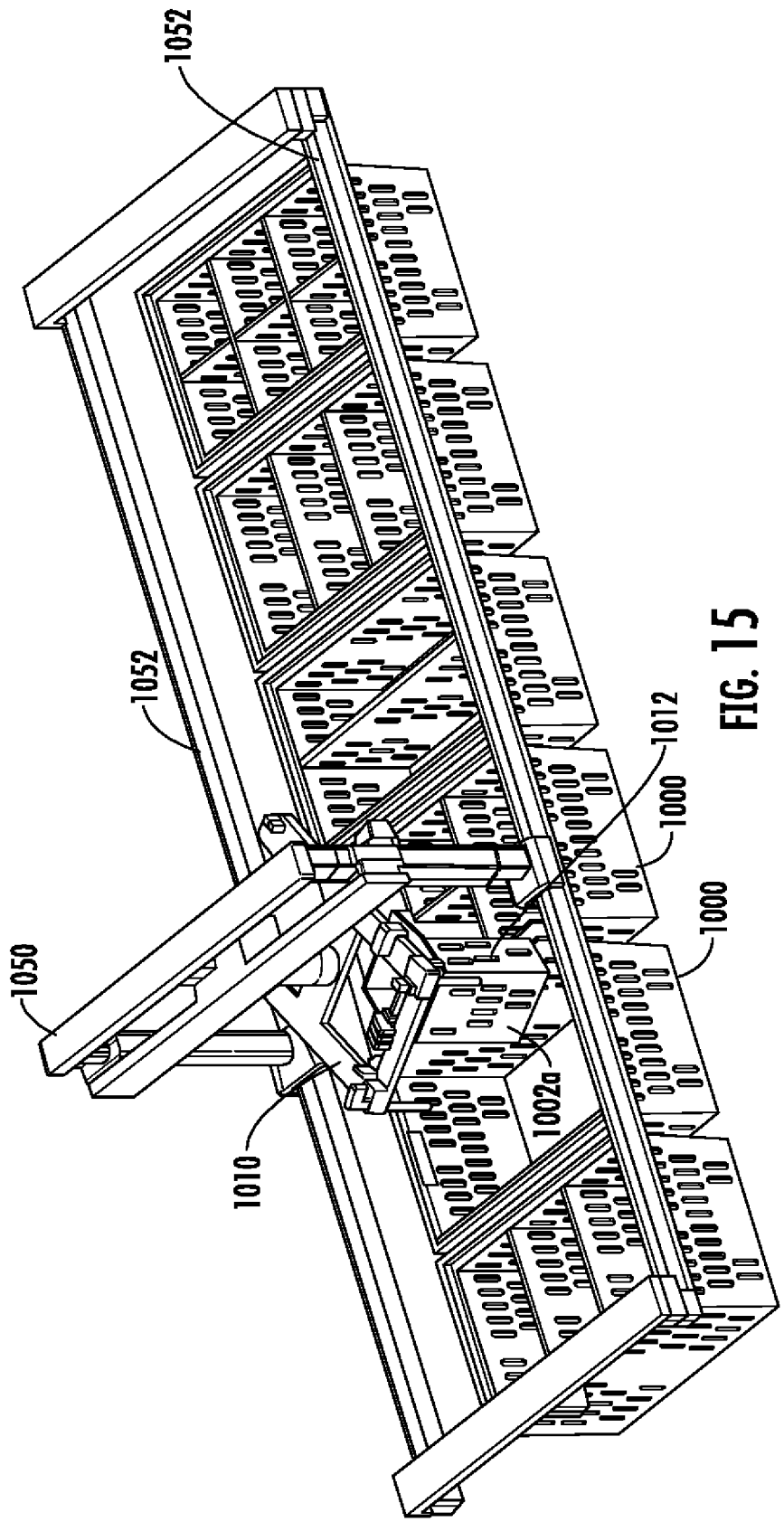

FIG. 12 shows the sub-tote 1002a in the half-lifted position out of the source tote 1000, supported on the first pair of tines 1012. FIG. 13 shows the sub-tote 1002a fully lifted out of the source tote 1000. FIG. 14 shows the Cartesian robot 1050 translating and rotating the gripper 1010 and sub-tote 1002a simultaneously. Rotation of the sub-tote 1002a is needed in this example, as the sub-tote 1002a is being placed in the opposite side of the destination tote, as compared to the source tote. FIG. 15 shows continued rotation and translation of the sub-tote 1002a on the gripper 1010 and robot 1050. If the sub-tote 1002a was to be positioned in the middle of the other side, or opposite corner of the source corner location, the tines would also be translated within the gripper 1010 during the movement of the gripper.

Figure 16:
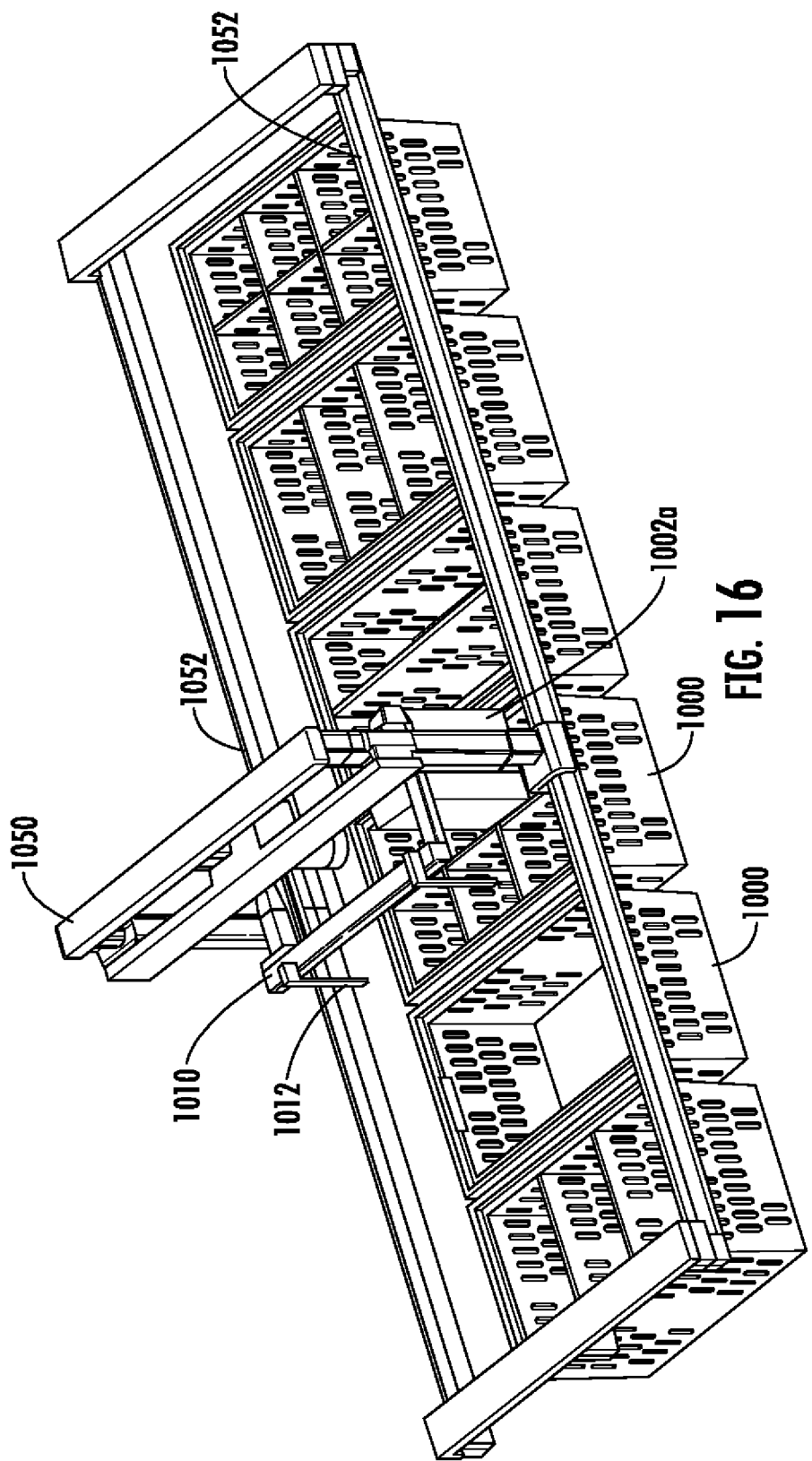
Figure 17:
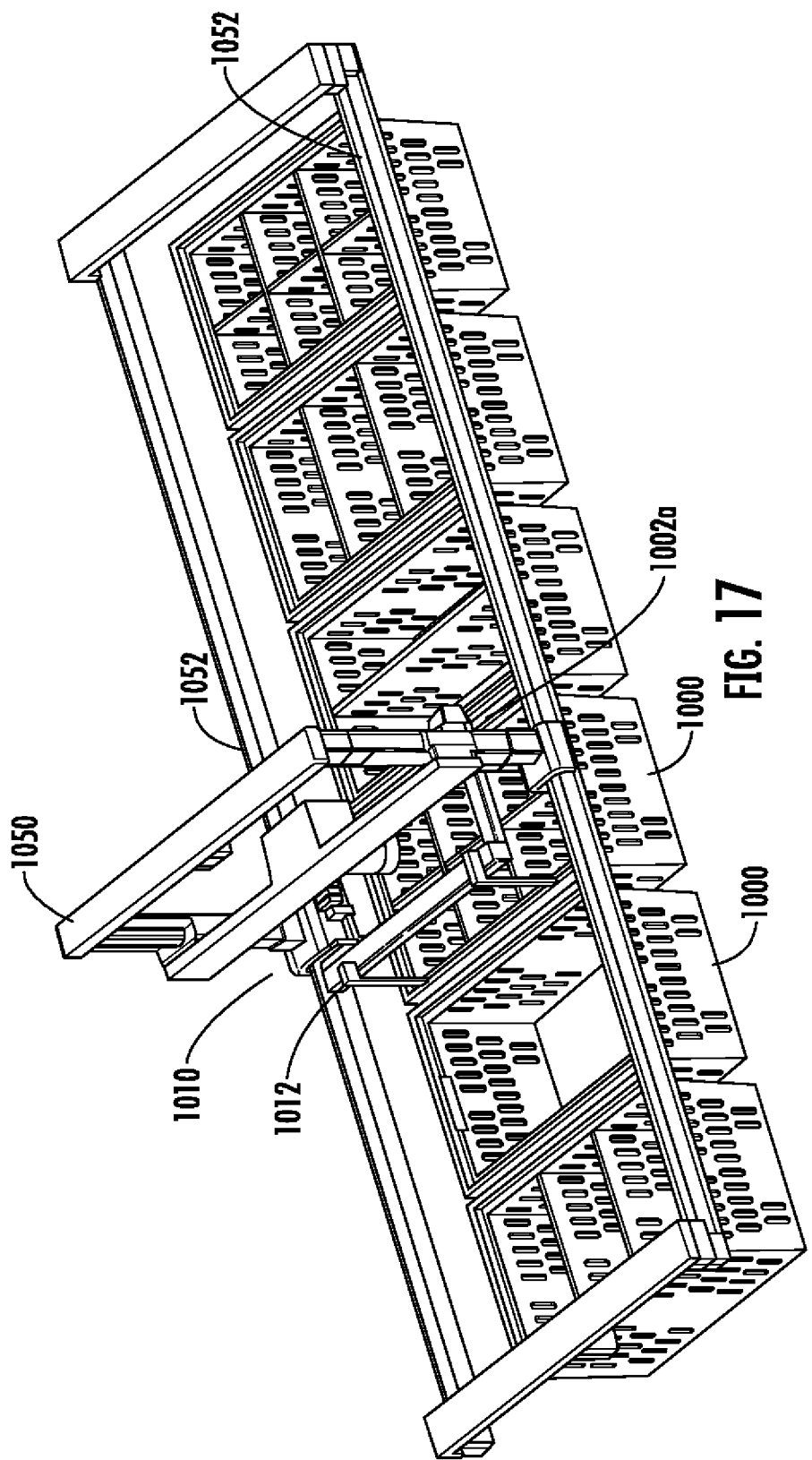
Figure 18:
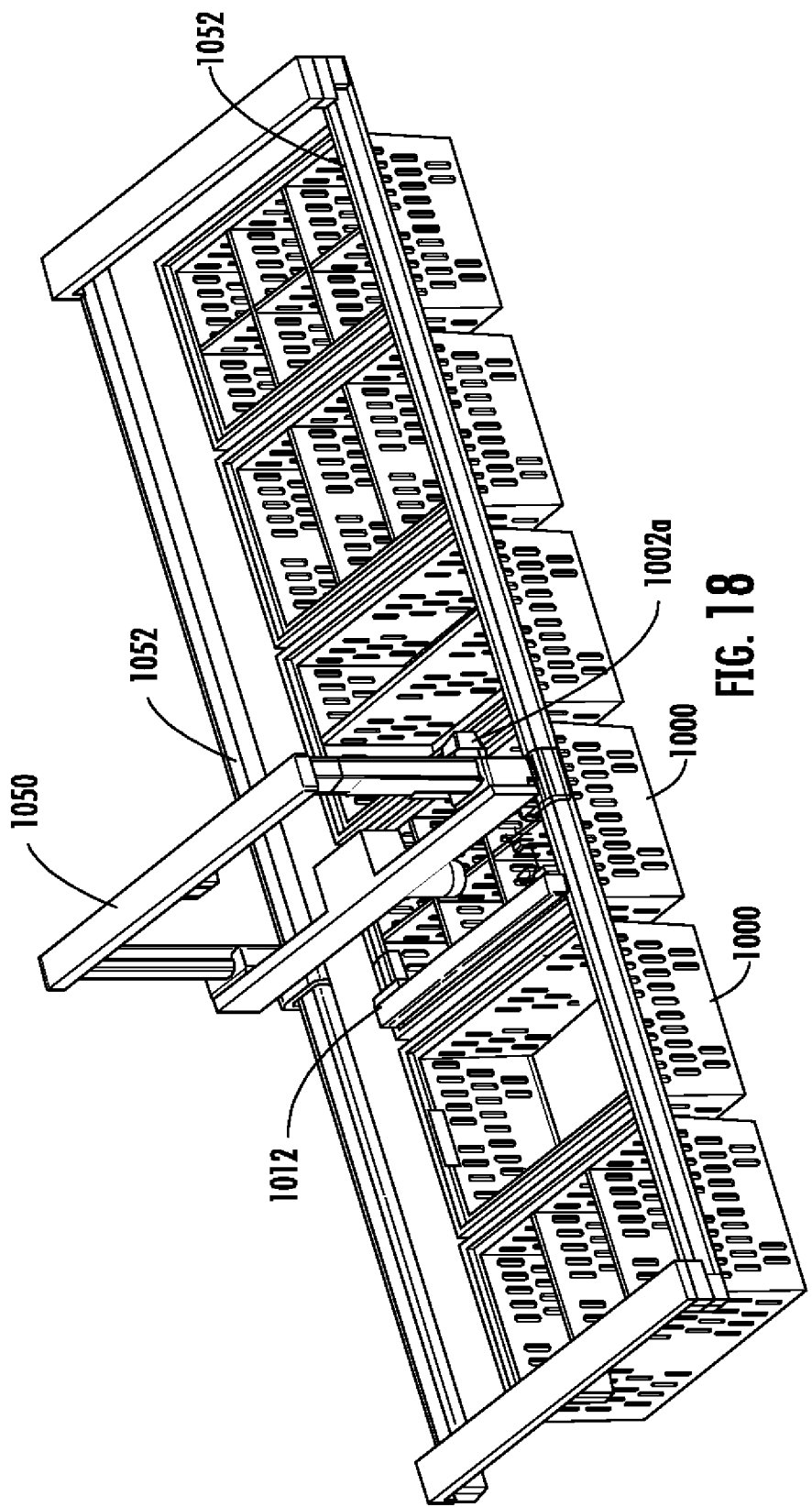
Figure 19:
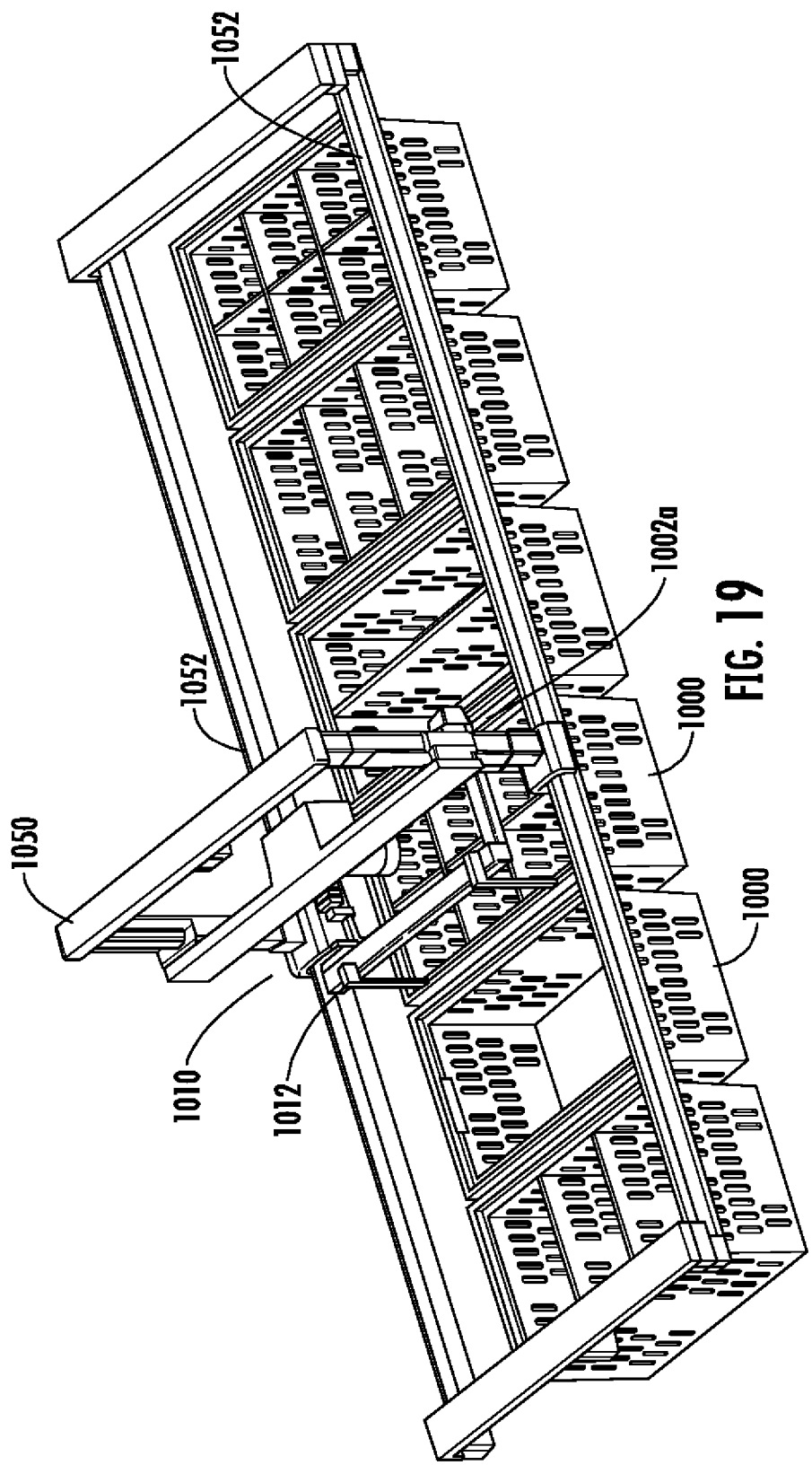

FIG. 16 shows the Cartesian robot 1050 having translated and rotated the sub-tote 1002a over its destination position. FIG. 17 shows the Cartesian robot having partially lowered the gripper 1010 and sub-tote 1002a into the destination location. FIG. 18 shows the Cartesian robot having fully lowered the gripper and sub-tote into the destination location. Once in this position, the tines 1012 are moved toward each other to disengage the lifting tabs from underneath the top external flange of the sub-tote. The tines on the opposite side of the gripper are positioned to allow them to extend into the slots of other sub-totes already contained within the destination full tote. As an alternative, the gripper 1010 could be lengthened to permit the tines not lifting or lowering sub-totes to straddle the outside of the full tote. FIG. 19 shows the gripper 1010 and robot 1050 after releasing the sub-tote 1002a in its destination position. The gripper 1010 with its tines 1012 are lifted out of the slot of the sub-tote 1002a.

In accordance with an example embodiment, an apparatus may be provided comprising a robotic system having a robotic picking workstation, tote storage and retrieval and transit decks. The system has bots that autonomously transport totes from the storage and retrieval system to the robotic picking workstation via the transit decks. The robotic picking workstation has a picking lane where a robotic handler transports eaches from totes on the bots to order totes in the workstation. The robotic picking workstation further has a queuing buffer where bots are cued for the picking lane.

In accordance with another aspect, the robotic picking workstation has multiple levels where incoming bots flow into the workstation on a first level and outgoing bots flow out of the workstation on a second level.

In accordance with another aspect, the robotic picking workstation robotic handler comprises a gantry based robotic handler.

In accordance with an example embodiment, an apparatus may be provided comprising at least one processor and at least one non-transitory memory including computer program code, the at least one memory and the computer program code configured to, with the at least one processor, cause the apparatus to queue and schedule material through the robotic workstation.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In summary, in one example, the present technology relates to an automatic storage and retrieval system, comprising: storage shelves for storing containers; mobile robots for transferring containers around within the automatic storage and retrieval system; and a workstation comprising: a first end at which a mobile robot enters the workstation carrying a first container; a second end, opposite the first end, at which the mobile robot exits the workstation, at least one support shelf configured to support at least one second container, the at least one support shelf positioned to at least one side of the mobile robot as the mobile robot moves between the first and second ends of the workstation, and an automated picker for transferring items between the first container and the at least one second container as the mobile robot moves from the first end to the second end of the workstation.

In another example, the present technology relates to a system for transferring items between containers within an automatic storage and retrieval system, the system comprising: a mobile robot comprising wheels configured to move the mobile robot, the mobile robot comprising a first support location configured to support a first container; at least one second support location configured to support at least one second container; and an automated picker, mounted on the mobile robot, configured to transfer items between the first container and the at least one second container.

In a further example, the present technology relates to a system for transferring items between containers within an automatic storage and retrieval system, the system comprising: a mobile robot comprising wheels configured to move the mobile robot around within the automatic storage and retrieval system the workstation, the mobile robot comprising: a first container location for supporting a first container, and a second container location for supporting a second container; and an automated picker for transferring items to or from the first and second containers.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. It is intended that the scope of the method be defined by the claims appended hereto.

We claim:

1. An automatic storage and retrieval system, comprising:
   a first set of support shelves for storing a first set of containers;
   mobile robots for transferring containers around within the automatic storage and retrieval system; and
   a workstation comprising:
      a second set of support shelves at a plurality of different positions, the second set of support shelves configured to support a second set of containers, and
      an automated picker configured to transfer items to or from the second set of containers at each of the plurality of different positions within the workstation.

2. The automatic storage and retrieval system of claim 1, wherein the second set of containers comprise order totes and wherein the items are items transferred into the order totes on the second set of support shelves to fulfill customer orders.

3. The automatic storage and retrieval system of claim 1, wherein the second set of containers comprise product totes and wherein the items are items transferred to or from the product totes on the second set of support shelves to stock the product totes.

4. The automatic storage and retrieval system of claim 1, wherein the second set of containers comprise totes and the items transferred to or from the totes are sub-totes configured to fit within the totes.

5. The automatic storage and retrieval system of claim 1, wherein the automated picker is a cartesian robot configured to move to and between the plurality of different positions within the workstation.

6. The automatic storage and retrieval system of claim 5, wherein the cartesian robot is mounted on rails to move the cartesian robot along a first axis through the workstation.

7. The automatic storage and retrieval system of claim 6, wherein the cartesian robot comprises a gripper configured to move along a second axis orthogonal to the first axis.

8. The automatic storage and retrieval system of claim 7, further comprising a control system, the control system configured to move the gripper along the first and second axes to a desired position of the plurality of different positions, and to control transfer of one or more items of the items to or from a container at the desired position.

9. The automatic storage and retrieval system of claim 1, wherein the mobile robots are configured to transfer containers between the first set of containers on the first set of support shelves and the second set of containers on the second set of support shelves in the workstation.

10. An automatic storage and retrieval system, comprising:
   a set of support shelves for storing containers;
   mobile robots for transferring the containers around within the automatic storage and retrieval system;
   a workstation comprising:
      a picking lane, the mobile robots moving the containers to a plurality of different positions along the picking lane, and
      an automated picker configured to transfer items to or from the containers at each of the plurality of different positions along the picking lane within the workstation; and a controller for controlling movement of the mobile robots to each of the plurality of different positions and for controlling transfer of items to or from the containers at each of the plurality of different positions.

11. The automatic storage and retrieval system of claim 10, wherein the set of support shelves comprises a first set of support shelves, and wherein the plurality of different positions along the picking lane comprise a first plurality of different positions, the workstation further comprising a second set of support shelves at a second plurality of different positions different than the first plurality of different positions, the second set of support shelves configured to support the containers, the automated picker configured to transfer items between the containers on the mobile robots at the first plurality of different positions and the containers on the second set of support shelves at the second plurality of different positions.

12. The automatic storage and retrieval system of claim 11, wherein the containers on the second set of support shelves are order totes, and wherein the containers on the mobile robots moving through the workstation are product totes, the automated picker transferring items from the product totes to the order totes to fulfill customer orders.

13. The automatic storage and retrieval system of claim 11, wherein the containers on the second set of support shelves are order totes, and wherein the containers on the mobile robots moving through the workstation are product totes, the automated picker transferring sub-totes from the product totes to the order totes to fulfill customer orders.

14. The automatic storage and retrieval system of claim 10, wherein the automated picker is a cartesian robot configured to move to and between the plurality of different positions within the workstation under control of the controller.

15. An automatic storage and retrieval system, comprising:
a first set of support shelves for storing containers;
mobile robots for transferring the containers around within the automatic storage and retrieval system; and
a workstation comprising:
a first level comprising a queuing buffer where the mobile robots carrying a first set of containers are buffered;
a second level, different than the first level, comprising:
a picking lane where the mobile robots carrying the first set of containers move to a first plurality of different positions along the picking lane in the workstation, and
a second set of support shelves at a second plurality of different positions in the workstation, the second set of support shelves configured to store a second set of containers;
a level-changing tower configured to move the mobile robots carrying the first set of containers between the first and second levels; and
an automated picker mounted for movement at a third level, the automated picker configured to transfer items between the first set of containers at the first plurality of different positions and the second set of containers at the second plurality of different positions.

16. The automatic storage and retrieval system of claim 15, further comprising a controller for controlling movement of the mobile robots on the first and second levels, and for controlling transfer of items from the first set of containers to the second set of containers.

17. The automatic storage and retrieval system of claim 15, wherein the third level is between the first and second levels.

18. The automatic storage and retrieval system of claim 15, further comprising a deck on the first level, the mobile robots configured to travel between the first set of support shelves and the workstation on the deck.

19. The automatic storage and retrieval system of claim 18, wherein the deck comprises a first deck, the automatic storage and retrieval system further comprising a second deck on the second level, the mobile robots configured to travel between the first set of support shelves and the workstation on the second deck.

20. The automatic storage and retrieval system of claim 19, wherein the mobile robots are configured to travel from the first set of support shelves to the workstation on the first deck, move from the first level to the second level on the level-changing tower, move through the workstation along the picking lane so that items may be removed from the first set of containers on the mobile robots, and return to the first set of support shelves on the second deck.

* * * * *